(12) United States Patent
Arakawa

(10) Patent No.: US 9,170,543 B2
(45) Date of Patent: Oct. 27, 2015

(54) INSPECTION APPARATUS CONFIGURED TO INSPECT A PRINTED PRODUCT BY POSITIONING A READING TARGET IMAGE OBTAINABLE BY READING THE PRINTED PRODUCT RELATIVE TO A REFERENCE IMAGE AND COLLATING THE READING TARGET IMAGE WITH THE REFERENCE IMAGE

(71) Applicant: CANON KABUSHIKI KAISHA, Tokyo (JP)

(72) Inventor: Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 13/708,463

(22) Filed: Dec. 7, 2012

(65) Prior Publication Data

US 2013/0148987 A1 Jun. 13, 2013

(30) Foreign Application Priority Data

Dec. 13, 2011 (JP) ................. 2011-272162

(51) Int. Cl.
*G06K 9/00* (2006.01)
*G03G 15/00* (2006.01)
(Continued)

(52) U.S. Cl.
CPC .......... *G03G 15/5062* (2013.01); *G06K 9/4604* (2013.01); *G06T 7/0083* (2013.01); *G06T 7/0085* (2013.01); *G06T 7/40* (2013.01)

(58) Field of Classification Search
CPC .......... H04N 1/00005; H04N 1/00026; H04N 1/00013; H04N 1/00015; H04N 1/00029; H04N 1/00063; H04N 2201/0006; G06T 7/0007; G06T 7/0085

USPC ......... 382/123, 125, 130, 135, 137, 140–145, 382/149, 151, 165, 111–113, 170, 172, 174, 382/175, 178, 190, 192–195, 199, 218–221, 382/255, 256, 265, 272, 275, 282, 283, 287, 382/289, 291–300, 304–309, 325
See application file for complete search history.

(56) References Cited

U.S. PATENT DOCUMENTS 3,715,724 A * 2/1973 Demonte et al. ............... 382/271
5,057,936 A * 10/1991 Bares ........................... 358/405
(Continued)

FOREIGN PATENT DOCUMENTS

JP 2010-249565 A 11/2010

*Primary Examiner* — Utpal Shah
*Assistant Examiner* — Narek Zohrabyan
(74) *Attorney, Agent, or Firm* — Canon U.S.A., Inc. IP Division

(57) ABSTRACT

An inspection apparatus inspects a printed product by positioning a reading target image of the printed product relative to a reference image and collating the reading target image with the reference image includes a positioning unit configured to perform positioning processing for the reference image and the reading target image with a first precision, and a detection unit configured to detect an image defect candidate area by collating the reading target image with the reference image, which have been positioned by the positioning unit. The positioning unit newly performs the positioning processing for the reference image and the reading target image in the image defect candidate area with a second precision that is higher than the first precision. The detection unit detects an image defect by collating the reading target image with the reference image in an area having been newly subjected to the positioning processing using the second precision.

6 Claims, 16 Drawing Sheets

(51) Int. Cl.
  *G06T 7/40* (2006.01)
  *G06T 7/00* (2006.01)
  *G06K 9/46* (2006.01)

(56) References Cited

U.S. PATENT DOCUMENTS

| | | | |
|---|---|---|---|
| 7,215,339 B1 * | 5/2007 | Dotson | 345/558 |
| 7,376,269 B2 * | 5/2008 | Klassen et al. | 382/167 |
| 7,616,803 B2 * | 11/2009 | Wakabayashi | 382/141 |
| 7,664,294 B2 * | 2/2010 | Sacher et al. | 382/112 |
| 7,729,536 B2 * | 6/2010 | Eguchi et al. | 382/173 |
| 7,783,104 B2 * | 8/2010 | Kawaragi | 382/149 |
| 8,005,292 B2 * | 8/2011 | Sakai et al. | 382/149 |
| 8,116,585 B2 * | 2/2012 | Wu et al. | 382/275 |
| 8,238,635 B2 * | 8/2012 | Can et al. | 382/131 |
| 8,259,350 B2 * | 9/2012 | Wu et al. | 358/1.9 |
| 8,326,079 B2 * | 12/2012 | Vans et al. | 382/275 |
| 8,581,976 B2 * | 11/2013 | Kurihara et al. | 348/126 |
| 8,675,980 B2 * | 3/2014 | Liege et al. | 382/254 |
| 8,888,224 B2 * | 11/2014 | Imamura et al. | 347/19 |
| 2003/0223631 A1 * | 12/2003 | Ine | 382/145 |
| 2004/0022429 A1 * | 2/2004 | Suzuki et al. | 382/145 |
| 2004/0109598 A1 * | 6/2004 | Weiss et al. | 382/141 |
| 2004/0126909 A1 * | 7/2004 | Obara et al. | 438/14 |
| 2005/0075801 A1 * | 4/2005 | Skeps et al. | 702/35 |
| 2006/0110009 A1 * | 5/2006 | Klassen et al. | 382/112 |
| 2007/0139740 A1 * | 6/2007 | Igura et al. | 358/518 |
| 2008/0013848 A1 * | 1/2008 | Wu et al. | 382/254 |
| 2008/0304056 A1 * | 12/2008 | Alles et al. | 356/237.5 |
| 2012/0070040 A1 * | 3/2012 | Vans et al. | 382/112 |
| 2012/0121139 A1 * | 5/2012 | Kojima et al. | 382/112 |
| 2012/0147397 A1 * | 6/2012 | Kawamoto | 358/1.9 |
| 2012/0182571 A1 * | 7/2012 | Wu et al. | 358/1.14 |
| 2012/0229618 A1 * | 9/2012 | Urano et al. | 348/92 |
| 2013/0057886 A1 * | 3/2013 | Yasuda | 358/1.13 |
| 2013/0114102 A1 * | 5/2013 | Yamamoto | 358/1.14 |
| 2013/0148863 A1 * | 6/2013 | Muraishi | 382/112 |
| 2013/0148912 A1 * | 6/2013 | Chong | 382/294 |
| 2013/0322736 A1 * | 12/2013 | Yu et al. | 382/149 |

* cited by examiner

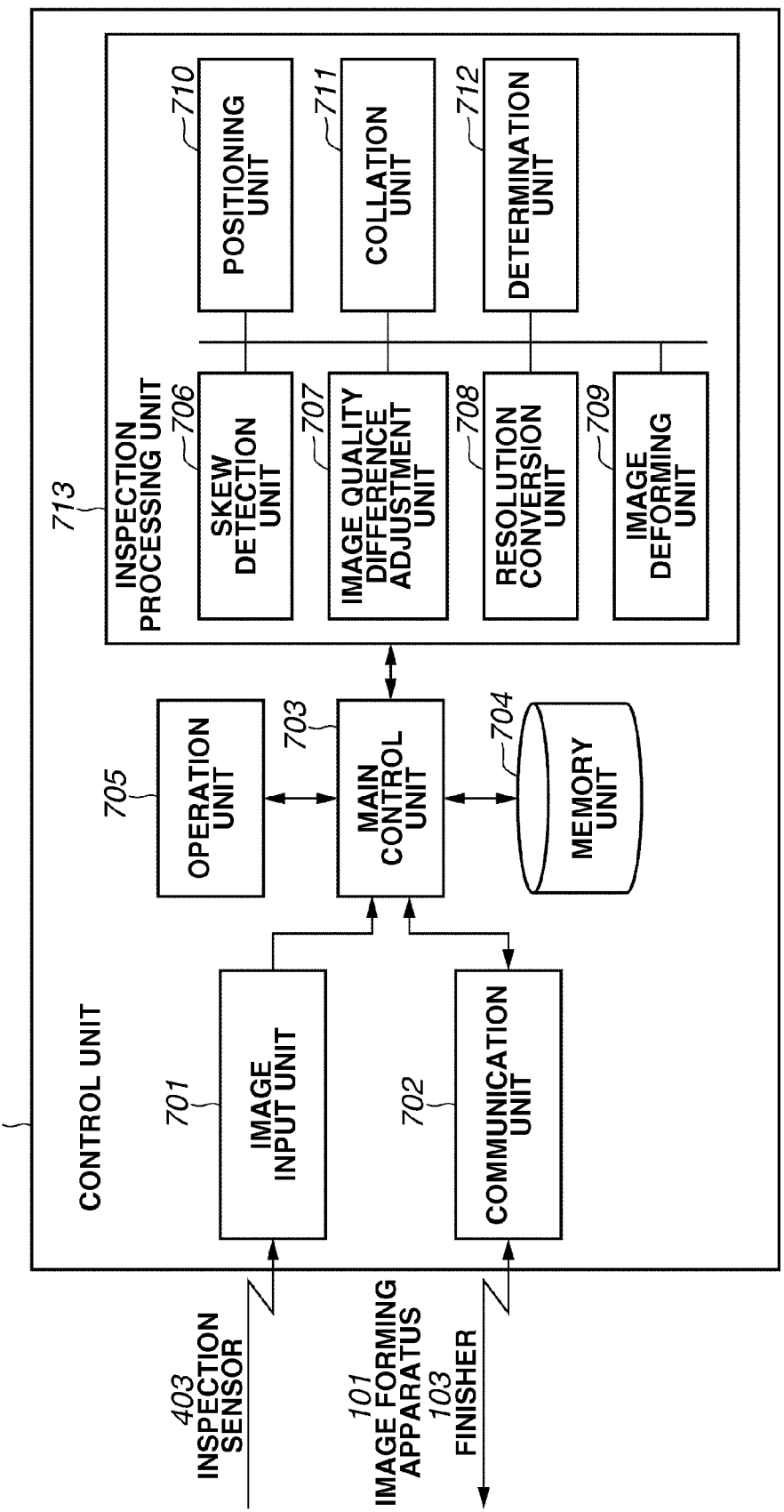

FIG.11C (refpX_i, refpY_i)

FIG.11D (scanpX_i, scanpY_i)

FIG.14A

| | | 製品 |
|---|---|---|
| | の通り御請求申し上げます。 | |
| 1 | iR-ADV 8095 | |
| 2 | LBP8630 | |

FIG.14B

の通り御請求申し上げます。 製品
1 iR-ADV 8095
2 LBP8630

FIG.14C

| | | 製品 |
|---|---|---|
| | の通り御請求申し上げます。 | |
| 1 | iR-ADV 8095 | |
| 2 | LBP8630 | |

請求書
会社名 最終検品株式会社
〒 211-8500
住所 神奈川県横浜市都筑区2丁目
TEL:044-123-4567
FAX:044-123-4568
部署名 検品開発センター
担当者 検品次郎

下記の通り御請求申し上げます。

| 項目 | 製品名 |
|---|---|
| 1 | iR-ADV 8095 |
| 2 | LBP8630 |

FIG.15B

請求書
会社名 最終検品株式会社 — 1501
〒 211-8500
住所 神奈川県横浜市都筑区2丁目
TEL:044-123-4567
FAX:044-123-4568
部署名 検品開発センター
担当者 検品次郎
1502

下記の通り御請求申し上げます。

| 項目 | 製品名 |
|---|---|
| 1 | iR-ADV 8095 |
| 2 | LBP8630 |

INSPECTION APPARATUS CONFIGURED TO INSPECT A PRINTED PRODUCT BY POSITIONING A READING TARGET IMAGE OBTAINABLE BY READING THE PRINTED PRODUCT RELATIVE TO A REFERENCE IMAGE AND COLLATING THE READING TARGET IMAGE WITH THE REFERENCE IMAGE

This application claims priority from Japanese Patent Application No. 2011-272162 filed Dec. 13, 2011, which is hereby incorporated by reference herein in its entirety.

BACKGROUND OF THE INVENTION

1. Field of the Invention

The present invention relates to an inspection apparatus, an inspection method, and a computer-readable storage medium.

2. Description of the Related Art

As discussed in Japanese Patent Application Laid-Open No. 2010-249565, it is conventionally known to collate a reading target image read by an imaging unit with a reference image to detect a defective portion (i.e., an image defect portion) in the reading target image. According to the above-described conventional technique, each reading target image is divided into a plurality of areas. A part of the areas of the reading target image is first subjected to a low-precision positioning processing with respect to the reference image and subsequently subjected to a high-precision positioning processing. The result of the low-precision positioning processing performed in the above-described partial area is directly used for a remaining area. Subsequently, the high-precision positioning processing is performed on the remaining area with respect to the reference image. As described above, it is feasible to reduce the amount of calculations required for the positioning processing and increase the processing speed by reflecting a low-precision positioning processing result of a partial area to high-precision positioning processing to be performed in other areas.

Although it depends on the feature (e.g., occurrence position) of an image defect, an image defect portion can be detected by performing collating after completing the low-precision positioning processing. However, according to the technique discussed in Japanese Patent Application Laid-Open No. 2010-249565, even the above-described area is subjected to the high-precision positioning processing. The high-precision positioning processing requires a great amount of calculations. Therefore, speedily completing the processing is feasible by eliminating the high-precision positioning processing when it is not necessary.

SUMMARY OF THE INVENTION

According to an aspect of the present invention, an inspection apparatus is configured to inspect a printed product by positioning a reading target image obtainable by reading the printed product relative to a reference image and collating the reading target image with the reference image. The inspection apparatus includes a positioning unit configured to perform positioning processing for the reference image and the reading target image with a first precision, and a detection unit configured to detect an image defect candidate area by collating the reading target image with the reference image, which have been positioned by the positioning unit. The positioning unit is configured to newly perform the positioning processing for the reference image and the reading target image in the image defect candidate area with a second precision that is higher than the first precision. The detection unit is configured to detect an image defect by collating the reading target image with the reference image in an area having been newly subjected to the positioning processing using the second precision.

According to an exemplary embodiment of the present invention, a high-precision positioning processing target area is selected with reference to the feature of an image defect candidate area, so that the processing speed can be increased.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a block diagram illustrating an example configuration of a control unit of the inspection apparatus according to an exemplary embodiment.

FIGS. 10A, 10B, 10C, 10D, 10E, and 10F illustrate an example patch selection in positioning processing according to an exemplary embodiment.

FIGS. 11A, 11B, 11C, and 11D illustrate an example correspondence between patches according to an exemplary embodiment.

FIGS. 14A, 14B, 14C, and 14D illustrate high-precision positioning processing according to an exemplary embodiment.

FIGS. 15A, 15B, 15C, and 15D illustrate inspection processing according to a second exemplary embodiment of the present invention.

DESCRIPTION OF THE EMBODIMENTS

Various exemplary embodiments, features, and aspects of the invention will be described in detail below with reference to the drawings.

Figure 1:
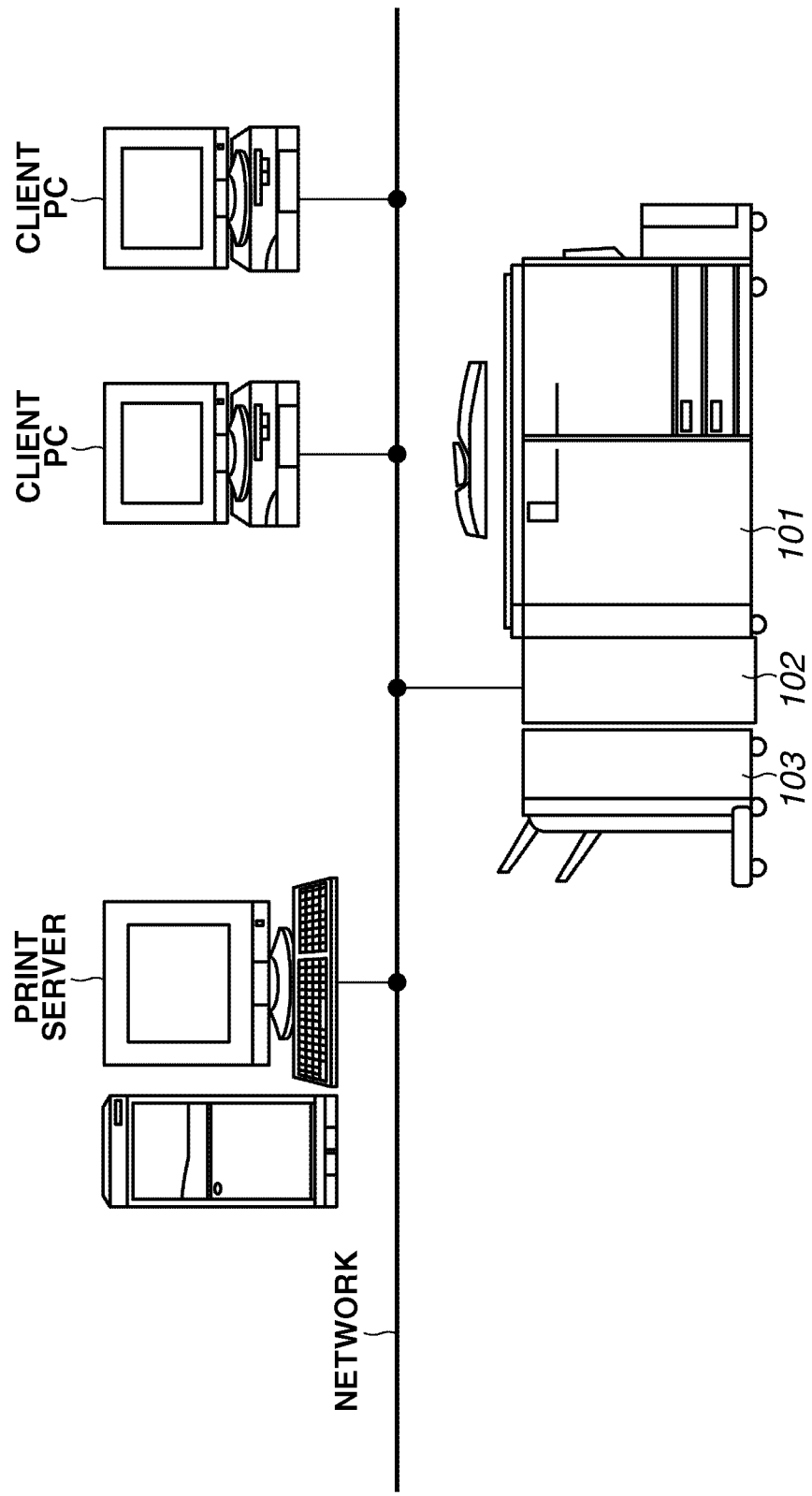
FIG. 1 illustrates an example configuration of an inspection system according to a first exemplary embodiment of the present invention.

FIG. 1 illustrates an example configuration of an inspection system according to a first exemplary embodiment of the present invention.

An image forming apparatus (e.g., a printing apparatus) 101 can process various input data and can perform printing based on the processed data to output a printed product.

An inspection apparatus 102 can receive the printed product from the image forming apparatus 101 and can inspect the printed product. The inspection apparatus 102 can convey the inspected printed product to a finisher 103.

The finisher 103 can receive the inspected printed product from the inspection apparatus 102 and can perform various post-processing on the received printed product.

In the inspection system including the above-described apparatuses, the image forming apparatus 101 can access an external device (e.g., a print server or a client PC) via a network and can perform data transmission/reception processing. Further, the inspection apparatus 102 is connected in a one-to-one relationship to the image forming apparatus 101 via a communication cable to transmit and receive inspection processing setting information and inspection processing result (e.g., inspection determination information). Further, the finisher 103 is connected in a one-to-one relationship to the image forming apparatus 101 via another communication cable to transmit and receive post-processing setting information. Further, the inspection apparatus 102 and the finisher 103 are mutually connected via another communication cable to transmit and receive inspection processing results (e.g., inspection determination information). From the above description, it is understood that the inspection system according to the present exemplary embodiment is an in-line inspection system, which sequentially performs printing, inspection, and finishing operations.

Figure 2:
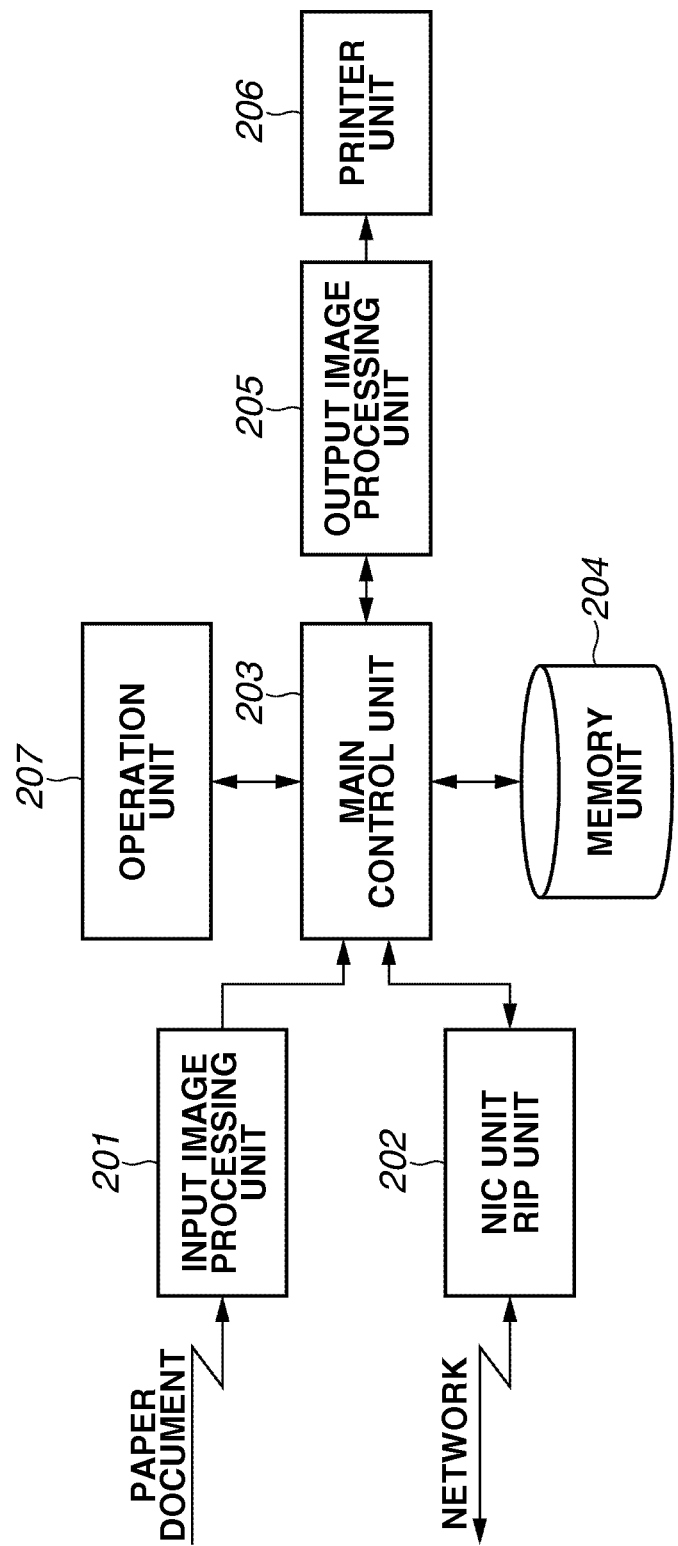
FIG. 2 is a block diagram illustrating an example configuration of a control unit of an image forming apparatus according to an exemplary embodiment.

FIG. 2 illustrates an example configuration of a control unit of the image forming apparatus 101.

An input image processing unit 201 is associated with an image reading apparatus, such as a scanner, which can read a paper document. The input image processing unit 201 can perform image processing on image data having been read.

A network interface card (NIC) unit 202 can receive page description language (PDL) data from a print server or a client PC via a network and send the received PDL data to a raster image processing (RIP) unit. The NIC unit 202 can transmit an image or apparatus information (i.e., internal data/information of the image forming apparatus) to an external device via the network. The RIP unit can generate bitmap image data by decoding the input PDL data and transmit the generated bitmap image data to a main control unit 203.

Although not illustrated, the main control unit 203 includes a central processing unit (CPU), a read only memory (ROM), and a random access memory (RAM), which are cooperatively operable and function as a control unit. The main control unit 203 can control data transmission/reception between an internal device provided in the apparatus and an external device located outside the apparatus. Further, the main control unit 203 can control the communication between the image forming apparatus 101 and the inspection apparatus 102. For example, the main control unit 203 receives inspection determination information (i.e., information indicating an inspection processing result of the printed product performed by the inspection apparatus 102). The main control unit 203 stops printing or performs a necessary operation according to the received inspection determination information. Further, the main control unit 203 stores the received image data in a memory unit 204 and, if necessary, transmits the image data stored in the memory unit 204 to an output image processing unit 205.

The output image processing unit 205 can perform image processing on the image data to perform printing and can transmit the processed image data to a printer unit 206. Further, the output image processing unit 205 can transmit the same image data (i.e., the image data having been transmitted to the printer unit 206), as a reference image, to the inspection apparatus 102. Further, if necessary, the output image processing unit 205 may transmit image data before it is processed by the output image processing unit 205, as a reference image, to the inspection apparatus 102.

The printer unit 206 can control electrophotographic processes including charging, exposure, development, transfer, and fixing to perform print processing based on the image data received from the output image processing unit 205.

An operation unit 207 can display selectable information that enables each user to control operations of the image forming apparatus 101, the inspection apparatus 102, and the finisher 103 and status information of respective apparatuses 101 to 103 on an operation panel (not illustrated). Further, the operation unit 207 can receive a user instruction via the operation panel and transmit the instruction information to the main control unit 203.

Figure 3:
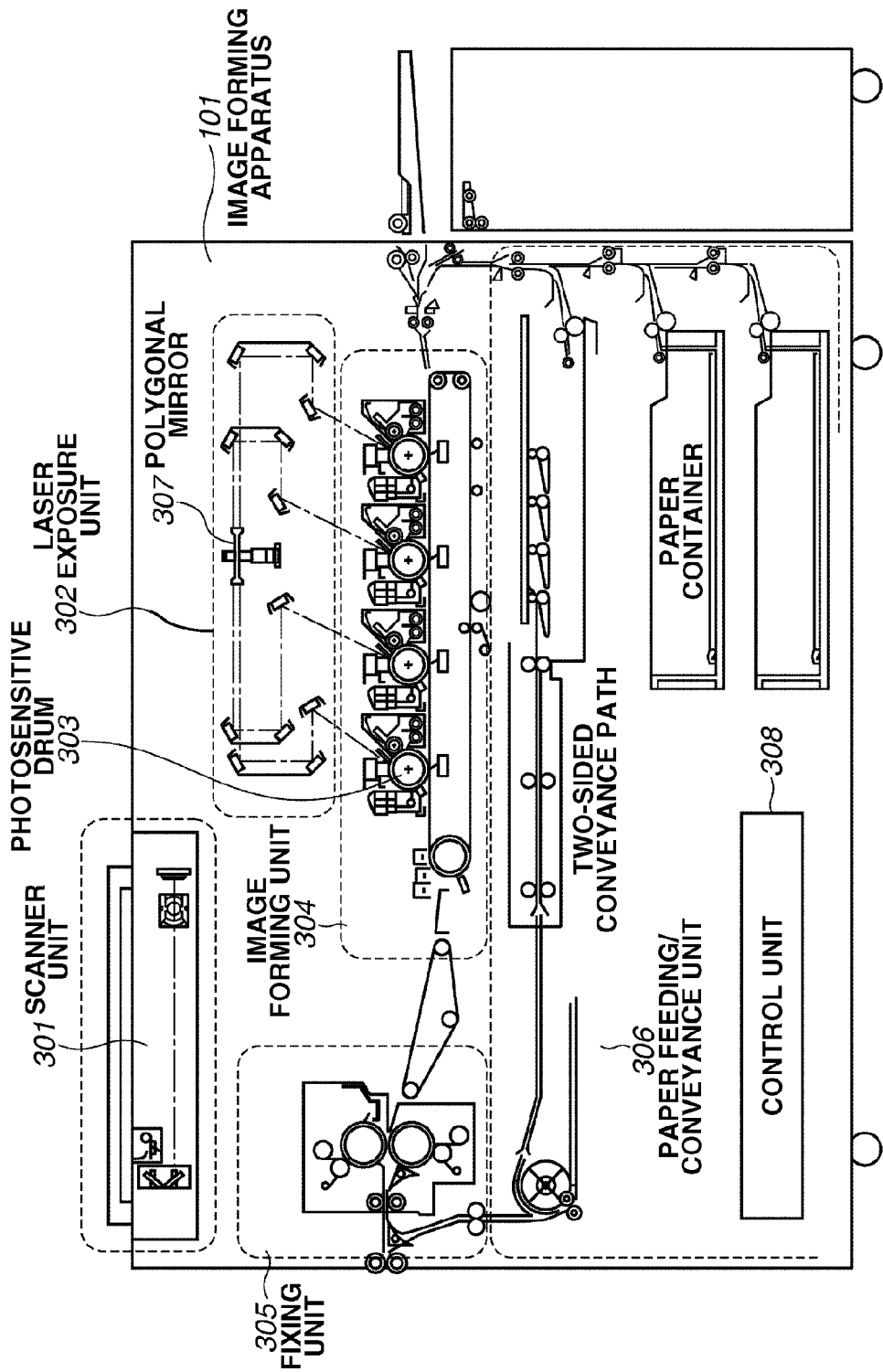
FIG. 3 illustrates a hardware configuration of the image forming apparatus according to an exemplary embodiment.

FIG. 3 illustrates an example hardware configuration of the image forming apparatus 101.

The image forming apparatus 101 includes a scanner unit 301, a laser exposure unit 302, a photosensitive drum 303, an image forming unit 304, a fixing unit 305, a paper feeding/conveyance unit 306, and a control unit 308, which controls these devices. The control unit 308 has a configuration illustrated in FIG. 2.

The scanner unit 301 can optically read an image of a document placed on a document positioning plate by irradiating the document with scanning light, and can convert the read image into an electric signal to generate image data.

The laser exposure unit 302 emits a light beam, such as a laser beam, modulated based on the above-described image data toward a rotary polygonal mirror 307, which is rotating at an equiangular speed. The light beam is reflected by the rotary polygonal mirror 307 and travels as a reflected scanning beam, which reaches the photosensitive drum 303.

The image forming unit 304 drives (rotates) the photosensitive drum 303, and causes a charging device to charge, and also causes the above-described laser exposure unit 302 to develop a latent image formed on the photosensitive drum 303 with toner particles. More specifically, there are four sequential developing units (or developing stations) each performing sequential electrophotographic processes including transferring a toner image onto a paper, and collect toner particles remaining on the photosensitive drum. Four sequential developing units of cyan (C), magenta (M), yellow (Y), and black (K) are arrayed in this order. When a predetermined time has elapsed since the preceding (e.g., cyan) station starts an image forming operation, the following (e.g., magenta, yellow, and black) image forming operations are sequentially performed. When the operation start timing of respective stations can be accurately controlled, a full-color toner image can be transferred onto a paper without causing any color misregistration. In the present exemplary embodiment, the image forming apparatus 101 is a color printer although it can be any other type printer. If the image forming apparatus 101 is a monochrome printer, the image forming unit 304 includes only the black developing unit.

The fixing unit 305 is configured as a combination of rollers and belts. The fixing unit 305 includes a built-in heat source (e.g., a halogen heater), which can fuse and fix the toner on the paper by applying heat and pressure after the toner image is transferred by the above-described image forming unit 304. If a thick paper (i.e., a paper having a lower thermal conductivity) is used in printing, the speed of the paper is controlled to be, for example, a half of the ordinary speed when the paper passes through the fixing unit 305. In this case, the paper conveyance speed of the thick paper is reduced to a comparable (i.e., a half) speed in the remaining device other than the fixing unit 305. Therefore, the image forming apparatus 101 operates at a half of the ordinary printing speed.

The paper feeding/conveyance unit 306 includes at least one paper container, which is represented by a paper cassette or a paper deck. The paper feeding/conveyance unit 306 separates (picks up) one of a plurality of sheets of paper stored in the paper container in accordance with an instruction from the above-described printer control unit, and supplies the separated sheet to the image forming unit 304 and the fixing unit 305 successively. Each color toner image is transferred to the sheet by the above-described developing station while the sheet is conveyed along the conveyance path. A full-color toner image can be finally formed on the sheet. Further, when the image forming apparatus 101 performs two-sided printing, a sheet having passed through the fixing unit 305 is conveyed again into the image forming unit 304 via a dedicated conveyance path.

Figure 5:
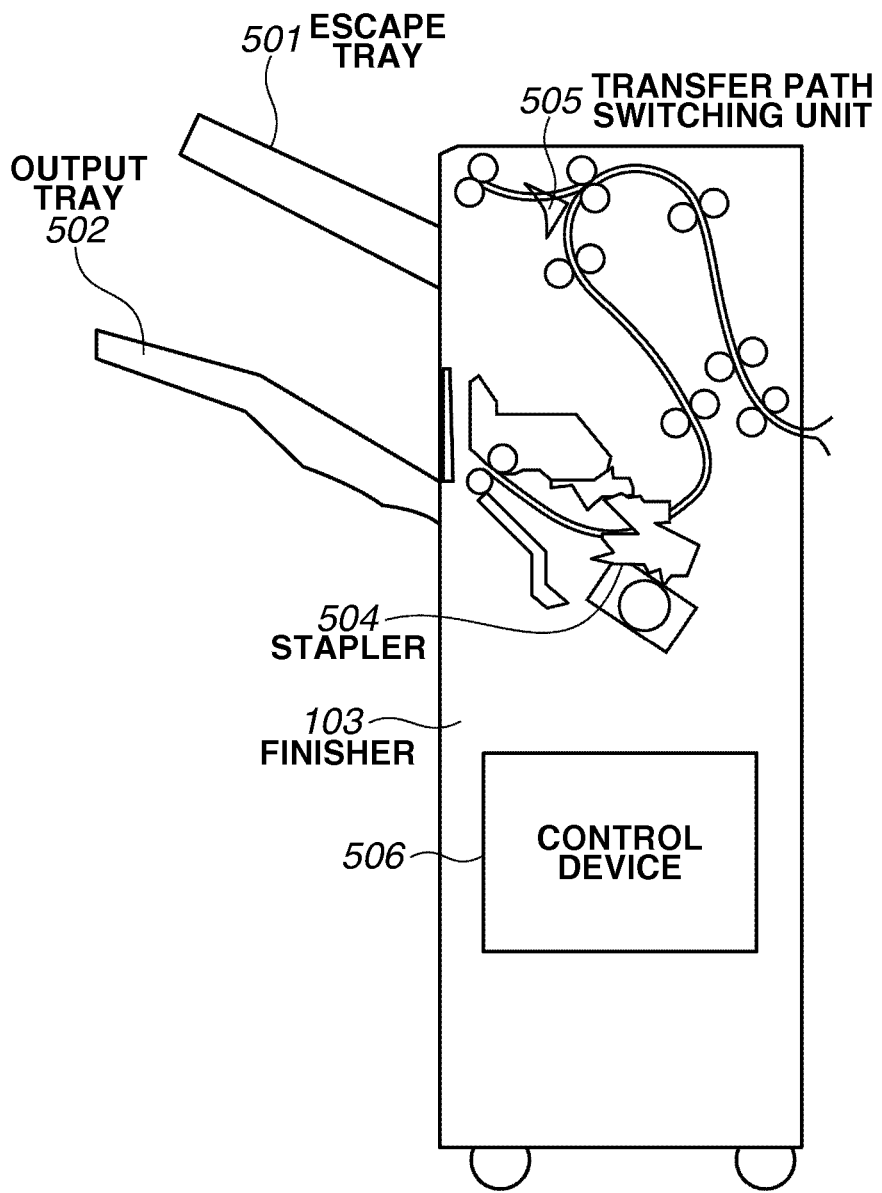
FIG. 5 illustrates a hardware configuration of a finisher according to an exemplary embodiment.

FIG. 5 illustrates an example hardware configuration of the finisher 103.

The finisher 103 receives a printed product if it is conveyed from the inspection apparatus 102. The finisher 103 includes an escape tray 501 and an output tray 502, each of which serves as a printed product discharge destination. The finisher 103 further includes a transfer path switching unit 505, which can switch a transfer path to selectively convey each printed product to one of the above-described two trays. Further, the finisher 103 includes a stapler 504, which can perform staple processing on the printed product. Further, the finisher 103 includes a control device 506, which can control various operations to be performed by the finisher 103. The control device 506 is described in detail below with reference to FIG. 6.

Figure 6:
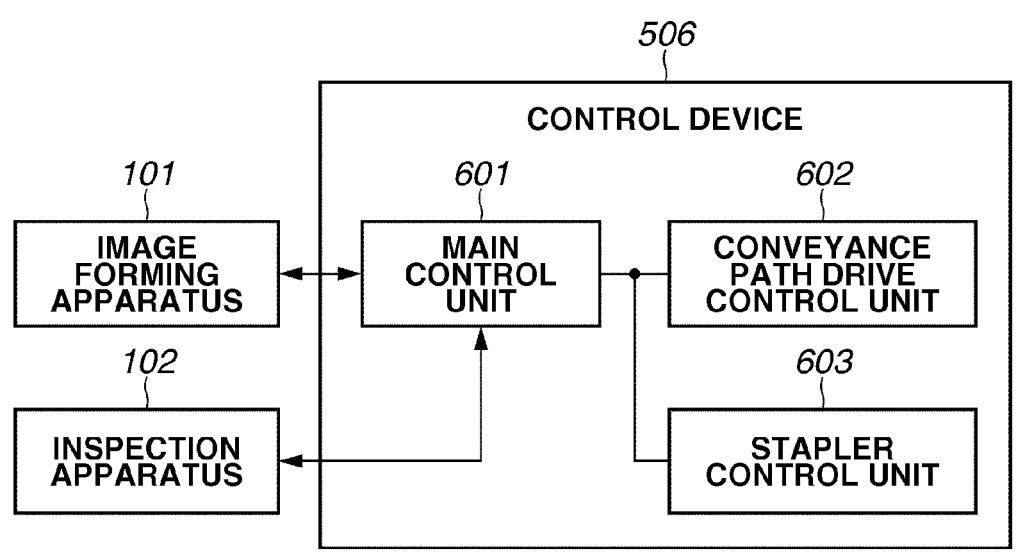
FIG. 6 is a block diagram illustrating an example configuration of a control device of the finisher according to an exemplary embodiment.

FIG. 6 illustrates an example configuration of the control device 506 provided in the finisher 103.

The control device 506 includes a main control unit 601, which is constituted by a CPU, a ROM, and a RAM (although they are not illustrated in the drawing), which are cooperatively operable and function as a control unit.

The main control unit 601 can communicate with the image forming apparatus 101 via a dedicated communication line. Further, the main control unit 601 can communicate with the inspection apparatus 102 via a dedicated communication line.

The main control unit 601 receives finisher setting information from the image forming apparatus 101. The finisher setting information instructs whether to perform post-processing (e.g., staple processing) on a printed product. The main control unit 601 further receives inspection determination information from the inspection apparatus 102. Then, the main control unit 601 communicates with each control unit (602, 603), which controls various functions of the finisher 103 based on the received information.

More specifically, the main control unit 601 transmits stapler control information to the stapler control unit 603 based on the received finisher setting information. The stapler control information indicates whether to perform staple processing on a printed product.

Further, the main control unit 601 transmits the stapler control information to the stapler control unit 603 based on the received inspection determination information. The main control unit 601 transmits conveyance path control information to the conveyance path drive control unit 602. The conveyance path control information instructs switching the printed product discharge destination. For example, if the main control unit 601 receives the inspection determination information indicating that a printed product includes an image defect, the main control unit 601 transmits stapler control information that instructs prohibiting the staple processing to the stapler control unit 603. Further, the main control unit 601 transmits conveyance path control information that instructs setting the escape tray 501 as the discharge destination to the conveyance path drive control unit 602. Further, if the main control unit 601 receives the inspection determination information indicating that a printed product does not include any image defect, the main control unit 601 transmits stapler control information that instructs performing the staple processing to the stapler control unit 603. Further, the main control unit 601 transmits conveyance path control information that instructs setting the output tray 502 as the discharge destination to the conveyance path drive control unit 602.

The conveyance path drive control unit 602 controls the printed product discharge destination by controlling the operation of the transfer path switching unit 505 based on the conveyance path control information transmitted from the main control unit 601.

The stapler control unit 603 performs staple processing on the printed product by controlling the operation of the stapler 504 based on the stapler control information transmitted from the main control unit 601.

Figure 4A:
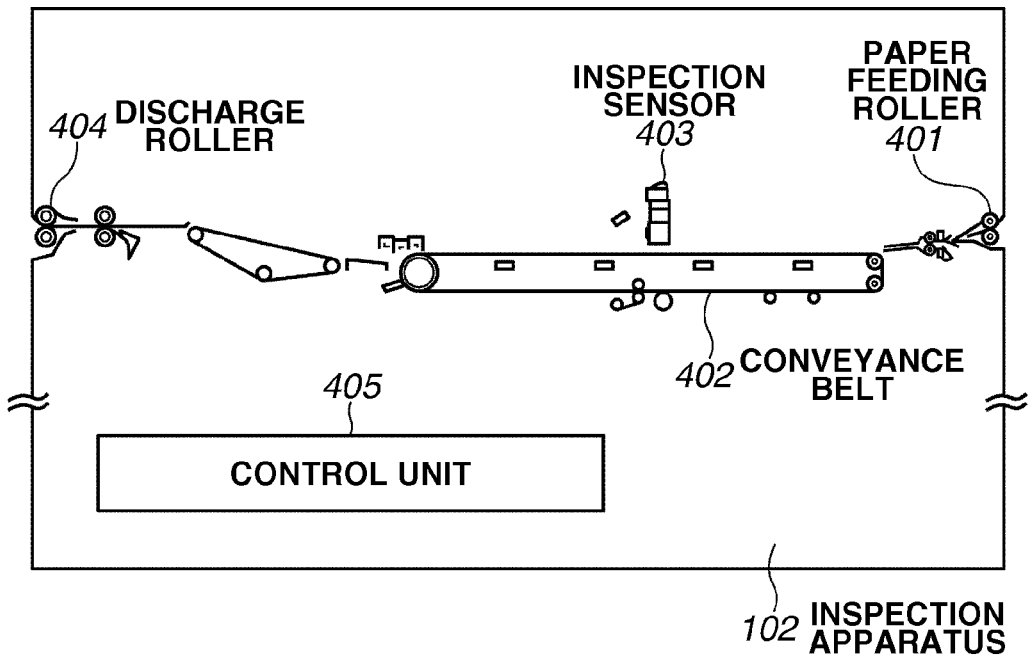
FIGS. 4A and 4B illustrate a hardware configuration of an inspection apparatus according to an exemplary embodiment.

FIG. 4A illustrates a hardware configuration of the inspection apparatus 102.

A paper feeding roller 401 pulls in a printed product that has been output from the image forming apparatus 101. Subsequently, the printed product is conveyed by a conveyance belt 402 and read by an inspection sensor 403 provided closely to the conveyance belt 402. Although not illustrated, it is useful to provide a pair of inspection sensors on the upper and lower sides of the conveyance belt 402 so that a two-sided printed product can be read by two inspection sensors 403.

A control unit 405 performs inspection processing on an image read by the inspection sensor 403 (i.e., a scanned image) and transmits inspection processing result information (inspection determination information) to the image forming apparatus 101 and the finisher 103. A detailed configuration of the control unit 405 and inspection processing that can be performed by the control unit 405 are described in detail below with reference to FIG. 7 and FIG. 9. Further, the control unit 405 controls various operations to be performed by the inspection apparatus 102.

A discharge roller 404 conveys each printed product having been subjected to the inspection processing to the finisher 103.

Figure 4B:
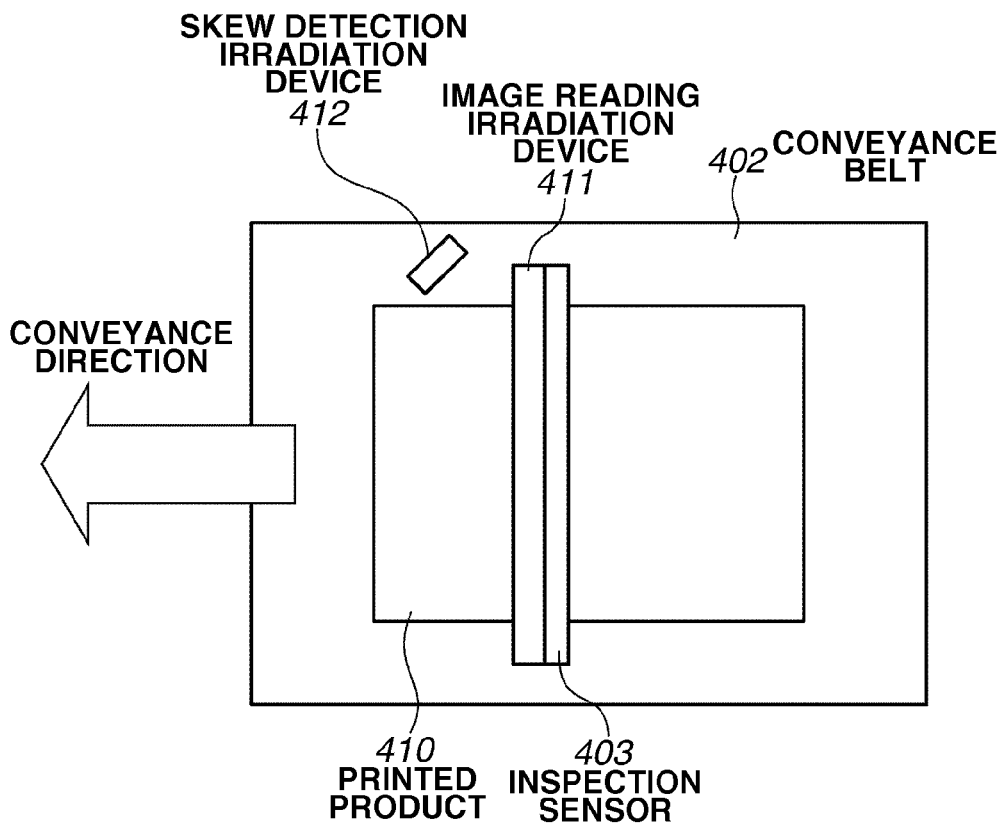

FIG. 4B is a plan view illustrating a part of the conveyance belt 402. As illustrated in FIG. 4B, the inspection sensor 403 is a line sensor, which can read the entire image of a conveyed printed product 410 based on a line-to-line basis.

An image reading irradiation device 411 is an irradiation apparatus dedicated to image reading processing, which irradiates a printed product with light when the inspection sensor 403 reads the printed product.

A skew detection irradiation device 412 irradiates a conveyed printed product with light from an oblique direction to check a skew of the printed product 410 relative to the conveyance direction when the printed product 410 is conveyed by the conveyance belt 402. The inspection sensor 403 detects the skew of the conveyed printed product by reading the shadow of an edge portion of the irradiated printed product. In the present exemplary embodiment, although the inspection sensor 403 reads the shadow of the printed product edge portion, it is also useful to use any other reading sensor that is comparable to the inspection sensor 403.

FIG. 7 illustrates an example hardware configuration of the control unit 405 provided in the inspection apparatus 102.

The control unit 405 includes a main control unit 703, which is constituted by a CPU, a ROM, and a RAM (although they are not illustrated in the drawing), which are cooperatively operable and function as a control unit. Further, the main control unit 703 can control various operations to be performed by the processing units provided in the control unit 405 to control the overall operation of the inspection apparatus 102.

An image input unit 701 receives a scanned image read by and transmitted from the inspection sensor 403. The received scanned image is stored in a memory unit 704.

A communication unit 702 can communicate with the image forming apparatus 101 and the finisher 103. The communication unit 702 receives a reference image through the communication, and further performs transmission/reception of inspection control information. The received reference image and the inspection control information are stored in the memory unit 704.

An example of the inspection control information to be transmitted and received between the image forming apparatus 101 and the inspection apparatus 102 is the inspection determination information. Further, an example of the inspection control information is synchronization information (e.g., printing job information, number of printed products information, page order information), which is required to control the correspondence between the scanned image and the reference image. The synchronization information is required in a case where the image forming apparatus 101 performs two-sided printing or multiple printing, in which the inspection apparatus 102 receives a scanned image and a reference image (i.e., an image used to print the scanned image) in a different order. Further, the synchronization information is required in a case where one reference image is in a correspondence relationship with a plurality of scanned images.

The inspection control information to be transmitted and received between the finisher 103 and the inspection apparatus 102 is inspection determination information.

An operation unit 705 can display an inspection processing result on its operation panel (not illustrated).

An inspection processing unit 713 performs inspection processing on a printed product based on the reference image and the scanned image. The inspection processing unit 713 is described in detail below.

The inspection processing unit 713 has the following configuration.

Figure 8A:
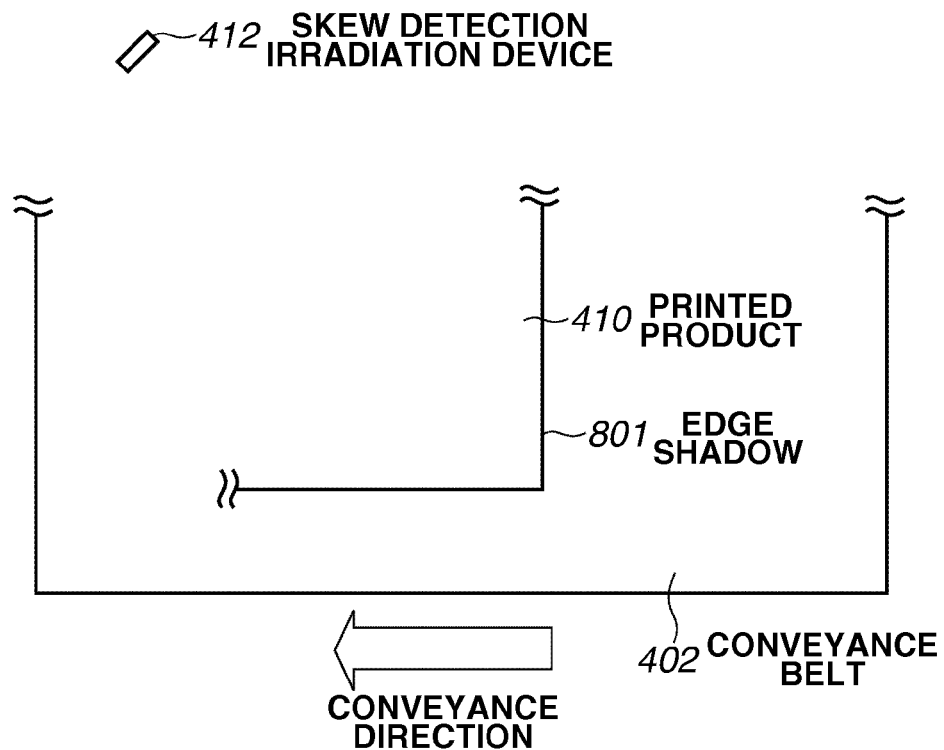
FIGS. 8A and 8B illustrate skew detection processing according to an exemplary embodiment.

A skew detection unit 706 can detect a skew of the printed product and can generate skew angle information. A detailed skew detection is described below with reference to FIG. 8.

As described above, the inspection sensor 403 reads an edge shadow 801 (i.e., the shadow of an edge portion of the printed product 410) that can be generated when the light is emitted from the irradiation device 412. The read shadow is transmitted, as a shadow image, to the skew detection unit 706.

Figure 8B:
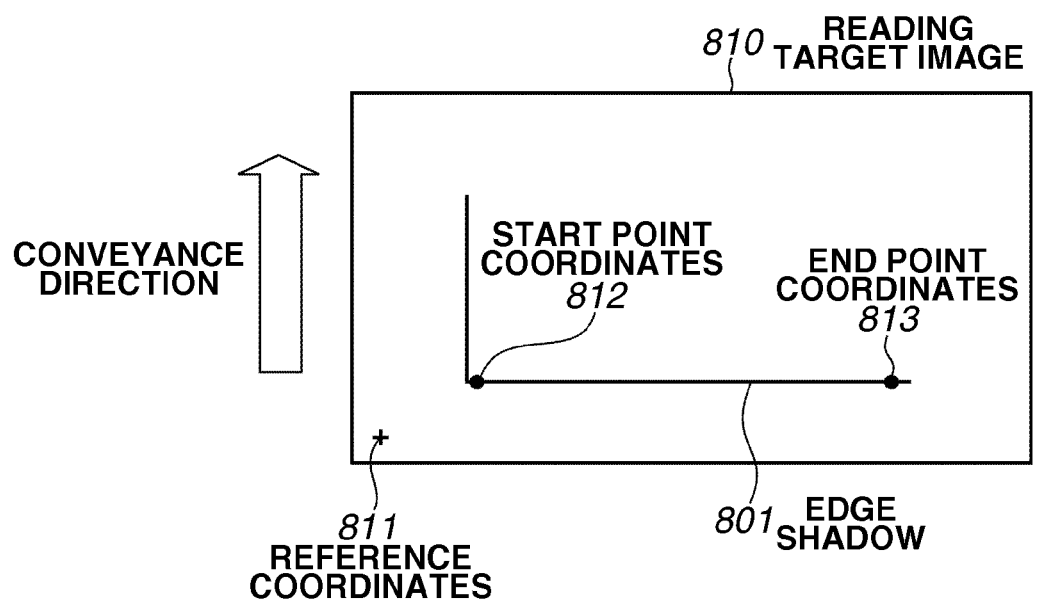

The skew detection unit 706 performs binary processing and edge detection processing on the shadow image to detect the skew of the shadow image. For example, FIG. 8B illustrates an image obtained when a shadow image has been subjected to the binary processing and the edge detection processing. In this case, the skew detection unit 706 determines a reference coordinate point 811. Then, the skew detection unit 706 determines the coordinates of a start point 812 and the coordinates of an end point 813 on the edge shadow 801. Then, the skew detection unit 706 obtains relative coordinate values of the start point 812 and the end point 813 relative to the reference coordinate point 811.

If the reference coordinate point 811 is positioned on the origin (0, 0), the start point 812 has coordinate values (300, 245) and the end point 813 has coordinate values (235, 3885). The skew detection unit 706 obtains an inclination θ (deg) of the edge shadow 801 based on the relative coordinate values of the start and end points 812 and 813. In this case, the inclination θ (deg) can be obtained according to the following formula.

$$\theta = \tan^{-1}((235-300)/(3885-245)) = -1.023 \text{ (deg)}$$

Accordingly, the skew detection unit 706 detects a clockwise skew of the printed product 410 at 1.023 (deg) relative to the conveyance direction. In a case where the skew angle of each printed product is substantially constant, it is useful to set the skew angle of the first printed product (or page) as a skew angle of the next or following printed product (or page). Alternatively, it is useful to designate the search start point of a shadow image considering the skew angle of the previous printed product (or page). As described above, the skew detection unit 706 detects the skew of the printed product and generates skew angle information. Further, the skew detection unit 706 stores the generated skew angle information in the memory unit 704.

An image quality difference adjustment unit 707 can adjust an image quality difference between the scanned image and the reference image, such as a difference in color space or a difference in entire luminosity.

The image quality difference occurs due to influences of pre-print image processing, image forming apparatus characteristics, and scanner characteristics, or differences in image format. The image quality difference occurs regardless of the presence of an image defect. The pre-print image processing includes color conversion processing, gamma processing, and halftone processing. Further, the image forming apparatus characteristics includes color reproducibility, dot gain, and gamma characteristics. Further, the scanner characteristics include color reproducibility, signal to noise ratio (S/N), and scanner Modulation Transfer Function (MTF). Further, the image format difference indicates that two images are different in the number of bits of one pixel. The image quality difference adjustment unit 707 performs correction processing on both of the scanned image and the reference image or only the reference image to remove these influences so that the scanned image and the reference image become equivalent in image quality if there is not any image defect.

The correction processing includes color conversion processing, gamma correction processing, filter processing (halftone smoothing processing or edge deformation adjustment processing), and bit width adjustment processing. In a case where the correction processing is performed on only the reference image, the image quality difference adjustment unit 707 generates an image equivalent to the scanned image based on simulation using the reference image. This is equivalent to simulating the characteristics of the image forming apparatus 101 and the inspection sensor 403 when no image defect occurs.

A resolution conversion unit 708 can convert the resolution of the scanned image or the reference image. The scanned image and the reference image may be mutually different in resolution when these images are input to the control unit 405. Further, the resolution of an image may be changed to control the precision in positioning processing (described below). In such cases, the resolution conversion unit 708 performs resolution conversion processing.

For example, it is now assumed that the scanned image is 600 dpi in the main scanning and 300 dpi in the sub scanning. On the other hand, the reference image is 1200 dpi in the main scanning and 1200 dpi in the sub scanning. If the inspection processing unit 713 requires the resolution of 300 dpi in each of the main scanning and the sub scanning, the resolution conversion unit 708 performs reduction/zoom processing on respective images to obtain images of 300 dpi in both the main scanning and the sub scanning. As an example zooming method, a conventional method is usable considering the amount of calculations and the required precision. For example, when the resolution conversion unit 708 performs zooming using a higher order interpolation (SINC) function, it is feasible to obtain a high-precision zooming result although a large amount of calculations is required. When the resolution conversion unit 708 performs zooming using the Nearest Neighbor Algorithm, it is feasible to reduce the amount of calculations although a low-precision zooming result is obtained.

An image deforming unit 709 can perform image deformation processing on the scanned image and the reference image. In general, paper expansion/contraction or skew in a printing operation or skew in a scanning operation may generate a geometrical difference between the scanned image and the reference image. The image deforming unit 709 corrects the geometrical difference between the scanned image and the reference image by performing image geometric deformation with reference to the skew angle information obtained from the skew detection unit 706 or positioning information obtained from a positioning unit 710.

For example, the geometrical difference is a combination of linear conversion (e.g., rotation, enlargement/reduction, and shearing) and parallel movement. The geometrical difference is expressible as an affine transformation. The image deforming unit 709 can perform correcting processing based on affine transformation parameters that can be obtained from the skew detection unit 706 or the positioning unit 710.

The image deforming unit 709 transmits the scanned image and the reference image, after these images have been subjected to the image geometric deformation processing, to a collation unit 711.

The positioning unit 710, the collation unit 711, and a determination unit 712 are described in detail below successively.

The positioning unit 710 performs positioning processing for the scanned image and the reference image. The positioning unit 710 calculates the affine transformation parameters (i.e., positioning information) to be used when the image deforming unit 709 performs the image geometric deformation processing. In the present exemplary embodiment, the scanned image and the reference image have the same resolution when they are subjected to the positioning processing performed by the positioning unit 710. In general, if the input resolution is high, the positioning accuracy can be improved although the amount of calculations increases.

There are various positioning methods. In the present exemplary embodiment, to reduce the amount of calculations, the positioning unit 710 performs positioning of the entire region of the image using image information and positional information of a partial image, e.g., a rectangular area (hereinafter, referred to as a patch or a patch image), not the entire region of the image. The positioning according to the present exemplary embodiment includes three steps of selection of each positioning patch, positioning for each patch, and calculation of affine transformation parameters. Respective steps are described in detail below.

First, an example selection of the positioning patch is described in detail below.

In the selection of each positioning patch, the positioning unit 710 selects a plurality of patches that are suitable for the positioning processing from the reference image. A patch having a larger corner feature quantity in a patch image is an example of the patch suitable for the positioning processing. The corner feature is a feature of an intersection point of two edges where two different standout edges extending in different directions are present at a local region. The corner feature quantity is a feature quantity representing the strength of the edge feature.

As an example corner feature detection method, there are various methods that are different in "edge feature" modeling. For example, the Harris corner detection method is conventionally known as an example method for calculating the corner feature quantity. The Harris corner detection method is characterized by calculating a corner feature quantity image based on a horizontal difference image (i.e., edge feature quantity image in the horizontal direction) and a vertical difference image (i.e., edge feature quantity image in the vertical direction). The calculated corner feature quantity image is an image that expresses the amount of a weaker edge of two edges that constitute the corner feature. Two edges that constitute the corner feature are generally strong edges. Therefore, even a relatively weak edge can express the magnitude of the corner feature quantity because its edge amount is large.

The positioning unit 710 calculates a corner feature quantity image based on the reference image and selects a patch having a large corner feature quantity that is equal to or greater than a predetermined threshold as a patch suitable for the positioning processing.

If the selection of patches is simply performed in order of the magnitude of corner feature quantity, the patches may be collected from a limited portion of the image. The affine transformation parameters obtained from these patches represent a geometric deformation of a local area of the image. Therefore, selecting patches from a limited local area is not desired in positioning the entire image. Hence, in the patch selection, it is desired that not only the magnitude of the corner feature quantity but also distribution of a selected patch in the image are taken into consideration. More specifically, the positioning unit 710 selects a patch whose corner feature quantity value is not large compared to the remaining portion of the entire image, as a patch to be used in the positioning processing, if the corner feature quantity value is sufficiently greater than a mean feature quantity of the patches in a local area of the image. Through the above-described processing, it is feasible to adequately distribute a plurality of patches to be used in the positioning processing in the reference image.

The positioning unit 710 performs patch selection processing based on a selection parameter. The selection parameter is a parameter that can be used to control the size of each patch to be selected and the number (or the density) of patches. If the patch size becomes greater and the number of patches increases, the positioning accuracy can be improved although the amount of calculations increases. More specifically, the accuracy in the positioning processing to be performed by the positioning unit 710 is dependent on the selection parameter.

An example of the patch selection processing is described in detail below with reference to FIGS. 10A, 10B, 10C, 10D, 10E, and 10F.

Figures 10A, 10B, 10C, 10D, 10E, 10F:
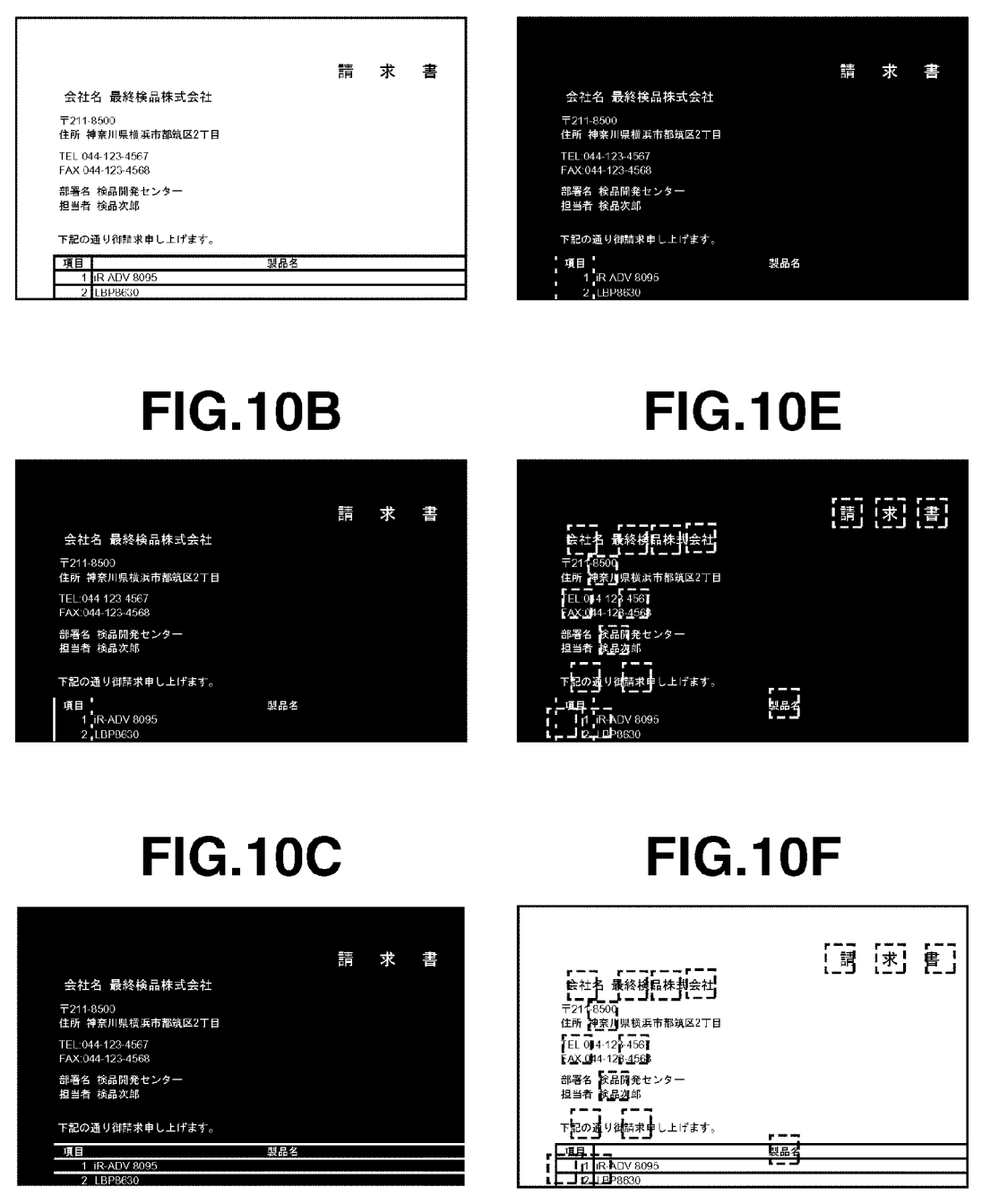

FIG. 10A illustrates an example of the reference image. FIG. 10B illustrates the intensity of the edge feature quantity of the reference image in the horizontal direction. Similarly, FIG. 10C illustrates the intensity of the edge feature quantity in the vertical direction. FIG. 10D illustrates an example of the corner feature quantity calculated based on the intensities of the edge feature quantity illustrated in FIG. 10B and FIG. 10C. In FIGS. 10B, 10C, and 10D, each white portion has a large feature quantity. From the illustration of FIG. 10D, it is understood that each bold character area and each intersection point of ruled lines are areas having a large corner feature quantity.

FIG. 10E illustrates an example selection of a plurality of patches to be used in the positioning processing, which can be selected based on the corner feature quantity information illustrated in FIG. 10D. An area encircled by a white dotted line is a selected patch area. If each area having a large corner feature quantity is simply selected as a patch, there is a possibility that the selection of patches is limited only to the upper left area and the lower left area. However, the selection of patches illustrated in FIG. 10E can be realized while the distribution of the selected patches is taken into consideration as described above.

FIG. 10F illustrates the reference image including the selected patches (see FIG. 10E), in which an area encircled by a black dotted line is a patch to be used in the positioning processing.

Next, an example positioning to be performed for each patch is described below.

In the present exemplary embodiment, the positioning unit 710 performs positioning processing for a previously selected positioning patch in the reference image and a corresponding patch in the scanned image.

FIGS. 11A, 11B, 11C, and 11D illustrate a positional correspondence relationship between the patches in both images.

FIG. 11A illustrates an example reference image including a plurality of positioning patches, each of which is indicated by a black dotted line frame.

FIG. 11B illustrates a plurality of areas (i.e., scan patches) in the scanned image, which are located at positions corresponding to the positioning patches (i.e., reference patches) in the reference image. In FIG. 11B, a black dotted line frame indicates a scan patch.

The positional correspondence relationship between the reference patches and the scan patches is described in detail below with reference to FIGS. 11C and 11D. For example, a scan patch illustrated in FIG. 11D corresponds to a reference patch illustrated in FIG. 11C. There are two pieces of information obtainable from the positioning processing applied to the above-described two patches. The first information is center coordinate values (refpX_i, refpY_i) of an i-th (i=1 to N, and N represents the number of patches) reference patch. The second information is coordinate values (scanpX_i, scanpY_i) of a scan patch, which represent a corresponding position of an image represented by the center coordinates of the reference patch.

Any shift amount estimation method that can obtain a positional correspondence relationship between the coordinate values (refpX_i, refpY_i) and (scanpX_i, scanpY_i) is employable as a positioning method. For example, a patch pair of a reference patch and a scan patch can be subjected to the Fast Fourier Transform (FFT) to estimate a shift amount by acquiring a correlation between the above-described two patches in a frequency space.

The positioning unit 710 can calculate the affine transformation parameters in the following manner. The affine transformation method is a coordinate conversion method that can be expressed by the following conversion formula.

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

The above-described formula includes six affine transformation parameters a, b, c, d, e, and f. In the present exemplary embodiment, (x, y) is (refpX_i, refpY_i) and (x', y') is (scanpX_i, scanpY_i). The positioning unit 710 calculates the affine transformation parameters using N pieces of conversion formulae that can be obtained from N pieces of patch pairs. For example, it is useful to use the least squares method to obtain the affine transformation parameters.

Then, the positioning unit 710 transmits the obtained affine transformation parameters, as positioning information, to the image deforming unit 709.

The collation unit 711 receives the scanned image and the reference image after the image deforming unit 709 has completed the image geometric deformation processing, and then performs collation for both images.

First, the collation unit 711 generates a difference image between the reference image and the scanned image. For example, the difference image can be calculated according to the following formula.

Difference image DIF(x,y)=DIS(reference image REF (x,y)−scanned image SCAN(x,y))

In the present exemplary embodiment, (x, y) represents coordinate values and DIS(*) represents the function that can obtain the distance between pixel values. In this case, DIS (*) can be the function that can obtain an absolute value of a pixel value difference if two images are both gray scale images, or can be the function that can obtain an absolute value of a gamma correction based difference. Further, DIS(*) can be the function that can obtain a color difference if two images are both color images.

Next, the collation unit 711 sets the pixel value of each area of the obtained difference image, if it has a pixel value equal to or less than a predetermined threshold, to zero (0) and generates a corrected difference image. The predetermined threshold is set to a value capable of preventing a pixel having an image quality difference that cannot be absorbed by the image processing to be performed by the image quality difference adjustment unit 707 from being detected as an image defect.

Next, the collation unit 711 connects pixels each having a non-zero pixel value to generate a pixel block of a pixel group having non-zero pixel values. The generated pixel block represents an area where there is a difference between the reference image and the scanned image.

Then, the collation unit 711 obtains an image feature quantity for each of all pixel blocks included in the image. The obtained image feature quantity indicates the magnitude of the difference between the reference image and the scanned image in each detected pixel block region (i.e., the area where there is a difference between the reference image and the scanned image).

In the present exemplary embodiment, a mean difference value and an area size are examples of the image feature quantity. The area size is equivalent to the total number of pixels in a pixel block region. The mean difference value can be obtained by dividing the sum of pixel values in the pixel block region by the area size. More specifically, when the mean difference value and the area size are large, the difference between two images is large. A variance value is also usable as the image feature quantity.

Further, after a processing target pixel block is subjected to high-precision positioning processing, the determination unit 712 can refer to the image feature quantity to determine whether the processing target pixel block is an area to be collated by the collation unit 711.

The collation unit 711 transmits the corrected difference image and the information relating to the pixel block (e.g., the positional information and the image feature quantity of each pixel block), as a collation result, to the determination unit 712.

As understood from the foregoing description, the collation unit 711 is functionally operable as a difference detection unit configured to detect an area where there is a difference between the reference image and the scanned image by generating the corrected difference image and the information relating to the pixel block.

The determination unit 712 performs determination processing to determine the presence of an image defect candidate with reference to the collation result received from the collation unit 711. More specifically, the determination unit 712 evaluates the image feature quantity for each pixel block and determines whether the target pixel block is an image defect candidate. For example, the determination unit 712 according to the present exemplary embodiment uses a criterion illustrated in FIG. 12 in a case where each of the area size and the mean difference value is the image feature quantity, in determining whether the target pixel block is an image defect candidate.

Figure 12:
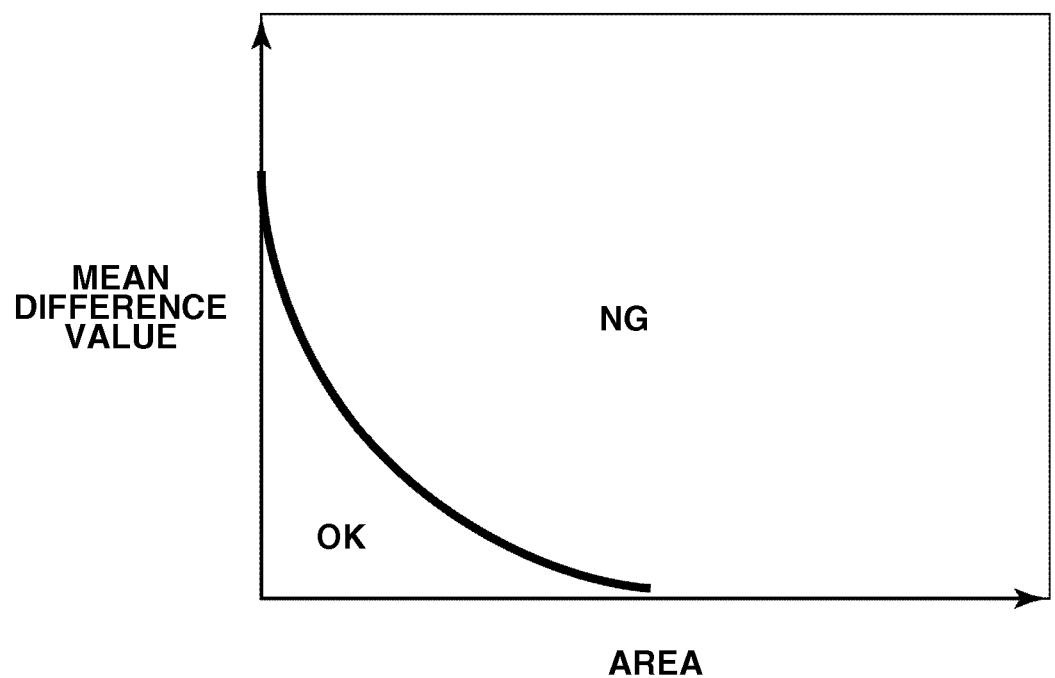
FIG. 12 illustrates an image defect criterion according to the first exemplary embodiment.

In FIG. 12, the abscissa axis represents the area size of a pixel block and the ordinate axis represents the mean difference value of the pixel block, which cooperatively define a feature quantity space. Further, FIG. 12 illustrates a boundary line (i.e., first criterion) that separates the feature quantity space into an OK region and an NG region. The OK region illustrated in FIG. 12 is an area where the pixel block is not regarded as an image defect candidate. The NG region illustrated in FIG. 12 is an area where the pixel block is regarded as an image defect candidate. The above-described graph information (which may be referred to as information relating to the first criterion) is stored beforehand in the memory unit 704. When the determination unit 712 performs determination processing, the determination unit 712 acquires the graph information from the memory unit 704 via the main control unit 703.

Further, in a case where three or more image feature quantities are present, the determination unit 712 reads information relating to a plane parameter (or a hyperplane parameter of [one dimensional image feature quantity]) that can discriminate the NG region from the other area in the feature space constituted by the image feature quantities from the memory unit 704 via the main control unit 703.

The determination unit 712 plots the image feature quantity of each pixel block in the feature quantity space illustrated in FIG. 12 and determines whether the image feature quantity of each pixel block is included in the OK region or the NG region illustrated in FIG. 12. More specifically, the determination unit 712 determines whether the image feature quantity of each pixel block is equal to or greater than the boundary value (i.e., the first criterion value) of the first criterion graph (see FIG. 12). If it is determined that the image feature quantity of the pixel block is equal to or greater than the threshold value illustrated in FIG. 12, the determination unit 712 regards the pixel block as an image defect candidate. If it is determined that the image feature quantity of the pixel block is less than the threshold value illustrated in FIG. 12, the determination unit 712 does not regard the pixel block as an image defect candidate.

As a determination result, if a pixel block region has not been regarded as an image defect candidate, the determination unit 712 sets a pixel value of the pixel block in the corrected difference image to 0. If the above-described determination processing for all pixel blocks has been completed, the determination unit 712 obtains each image, if only the area having been regarded as an image defect candidate is a non-zero area, as a determination result image.

The determination unit 712 outputs the determination result image together with information relating to each pixel block remaining on the determination result image.

As described above, the determination unit 712 is functionally operable as a candidate area detection unit configured to detect an image defect candidate area based on the magnitude of a difference between the reference image and the scanned image, which can be represented by the image feature quantity of the pixel block.

Figure 9:
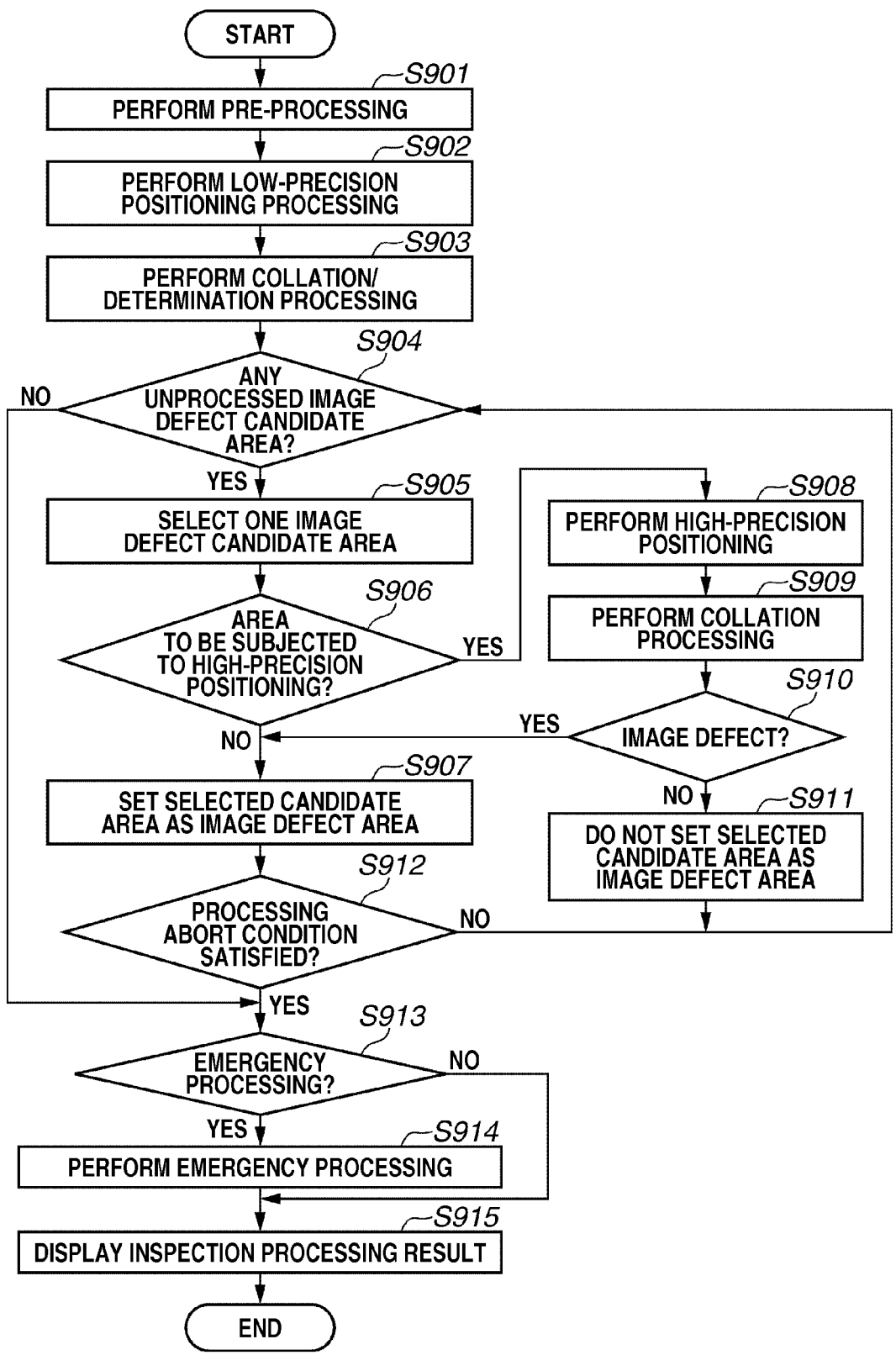
FIG. 9 is a flowchart illustrating a processing flow of inspection processing according to an exemplary embodiment.

Hereinafter, example inspection processing according to the present exemplary embodiment is described in detail below with reference to FIG. 9. FIG. 9 is a flowchart illustrating an example processing flow of sequential inspection processing according to the present exemplary embodiment. A computer program that can realize the above-describe sequential processing is stored in the memory unit 704. The main control unit 703 reads the computer program from the memory unit 704 and executes the readout computer program. The main control unit 703 controls each processing unit included in the control unit 405 so that the sequential processing of the flowchart illustrated in FIG. 9 can be executed. The following processing can be realized when each processing unit is controlled by the main control unit 703. Further, the result of processing performed by each processing unit is stored in the memory unit 704 and can be used in the subsequent processing.

In step S901, the skew detection unit 706 and the image quality difference adjustment unit 707 perform pre-processing for the inspection processing. First, the main control unit 703 selects an image pair (i.e., a combination of a scanned image and a reference image) to be processed with reference to the inspection control information received from the image forming apparatus 101 and stored in the memory unit 704.

Subsequently, the skew detection unit 706 processes the scanned image to generate skew angle information of scanned image. Then, the image deforming unit 709 performs correction processing on the scanned image based on the generated skew angle information. At the same time, the image quality difference adjustment unit 707 processes the reference image to obtain an image suitable for the inspection processing.

In step S902, the positioning unit 710 performs low-precision positioning processing for the scanned image and the reference image obtained in step S901. The accuracy in positioning and the amount of calculations are in a trade-off relationship. The reason why the positioning unit 710 performs low-precision positioning in step S902 is prioritizing reducing the amount of calculations. The parameters to be taken into consideration in the positioning are resolution, patch size, and patch density.

First, the resolution conversion unit 708 converts the scanned image and the reference image into images having a predetermined resolution (e.g., low-resolution of 150 dpi×150 dpi) that is suitable for the low-precision positioning processing.

Then, the positioning unit 710 performs positioning processing on the scanned image and the reference image that have the above-described predetermined resolution based on a selection parameter dedicated to the low-precision positioning processing, and obtains affine transformation parameters. For example, the selection parameter dedicated to the low-precision positioning processing is a patch size of 64 pixels× 64 pixels (i.e., small patch) and the patch density of one patch per 300 pixels×300 pixels (i.e., a low density).

Figure 13A:
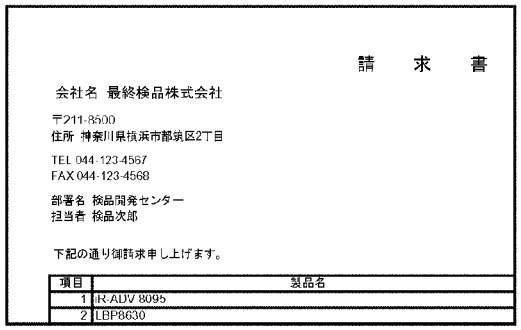
FIGS. 13A, 13B, 13C, 13D, 13E, and 13F illustrate inspection processing according to the first exemplary embodiment.
Figure 13D:
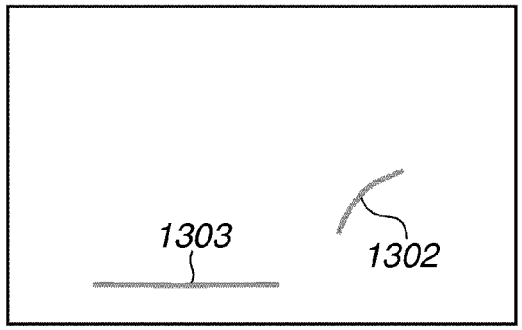
Figure 13B:
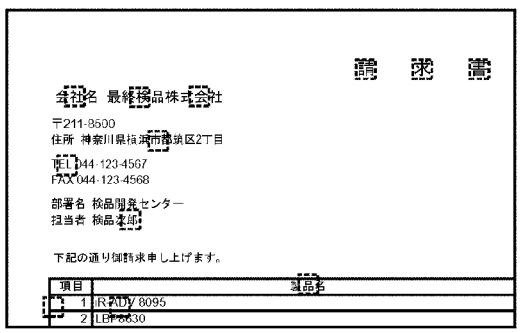

FIG. 13A illustrates an example of the reference image. FIG. 13B illustrates a plurality of low-precision positioning patches each being indicated by a black dotted line, which are superimposed on the reference image illustrated in FIG. 13A. The patch size is small and the density is low when the low-precision positioning processing is performed.

Then, the image deforming unit 709 performs reference image correction processing based on the affine transformation parameters obtained from the positioning unit 710 to obtain an image whose coordinate system is equalized with that of the scanned image and usable in the collation processing.

More specifically, in step S902, the resolution conversion unit 708, the positioning unit 710, and the image deforming unit 709 are functionally operable as a positioning unit configured to perform positioning for the reference image and the scanned image with a predetermined first precision.

In step S903, the control unit 405 performs collation/determination processing based on the scanned image and the reference image obtained in step S902. First, the collation unit 711 performs collation processing for the scanned image and the reference image.

Then, the determination unit 712 performs determination processing with reference to the processing result of the collation unit 711. The determination unit 712 uses the predetermined criterion (see FIG. 12) having been set beforehand via the operation unit 705 in the determination processing.

Figure 13E:
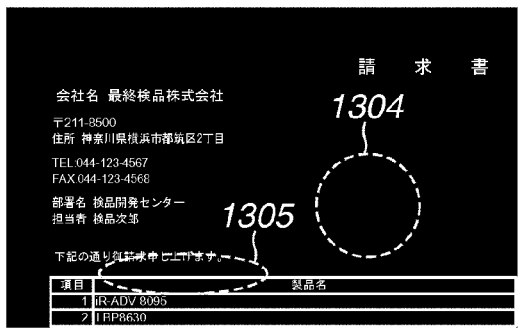
Figure 13C:
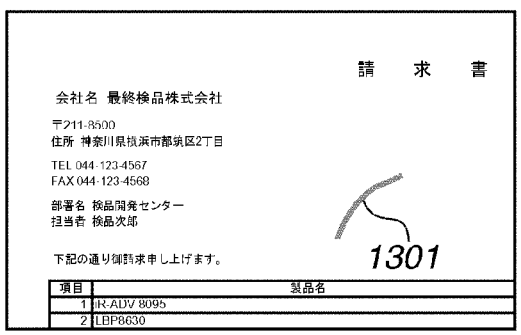
Figure 13F:
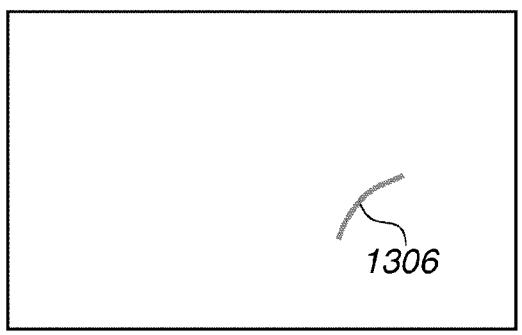

The image block of the determination result image having been output as a determination processing result is not the final result and is believed to be an image block of an image defect candidate. For example, in a case where FIG. 13A illustrates the reference image and FIG. 13C illustrates the scanned image, an image block 1302 and an image block 1303 illustrated in FIG. 13D (i.e., the determination result image) are the image block having been regarded as an image defect candidate as a result of the determination processing. FIG. 13C illustrates an image defect 1301 that has occurred in a printing operation. The image block 1302 is the image defect 1301 having been determined as an image defect candidate in the determination processing. On the other hand, the image block 1303 is the ruled line illustrated in FIG. 13C, which has been erroneously recognized as an image defect candidate, when a difference occurs in the generation of the difference image due to the positioning accuracy.

In step S904, the main control unit 703 determines whether the determination result image includes any unprocessed image defect candidate image block (i.e., an image defect candidate area). If there is not any image defect candidate, or when the processing for all image defect candidates is completed, the operation proceeds to step S913. If there is at least one unprocessed image failure candidate, the operation proceeds to step S905.

In step S905, the determination unit 712 selects one of the unprocessed image defect candidate image blocks as a target image block to be processed in step S906 to step S912.

In step S906, the determination unit 712 determines whether the pixel block region selected in step S905 is an area to be subjected to high-precision positioning processing.

Example processing to be performed in step S906 is described in detail below.

The pixel blocks selected in step S905 may include a pixel block detected due to the lowness in precision of the positioning processing performed in step S902.

There is the possibility that an erroneous determination may occur in an edge neighboring area of the reference image. The pixel value steeply changes in the edge neighboring area. Therefore, if the positioning accuracy is low, a large difference tends to be detected in the collation for the scanned image and the reference image. As a result, a corresponding portion is determined as an image defect candidate.

In other words, in a case where an edge is present in a neighboring area (i.e., a peripheral area) of the pixel block determined as an image defect candidate, there is the possibility that the pixel block is detected as an image defect candidate due to low-precision positioning accuracy. Further, if the collation/determination processing is performed on the above-described image defect candidate area through the high-precision positioning processing, there is the possibility of accurately determining that the pixel block is not an image defect.

Hence, in step S906, the determination unit 712 determines whether the processing target pixel block region is an area to be subjected to the high-precision positioning processing. More specifically, the determination unit 712 determines whether an edge (i.e., a feature point) is present in a peripheral area whose position corresponds to that of a pixel block region of the reference image.

Then, if it is determined that an edge is present, the determination unit 712 determines that the pixel block region is an area to be subjected to the high-precision positioning processing. In this case, the operation proceeds to step S908. On the other hand, if it is determined there is not any edge, the determination unit 712 determines that the pixel block region is an image defect area. In this case, the operation proceeds to step S907.

In the present exemplary embodiment, the peripheral area of a pixel block is an area whose distance from the periphery of the pixel block region is within N pixels, in which N is a value dependent on the accuracy of the low-precision positioning processing. For example, N is 2 to 3 pixels. Further, the peripheral area of the pixel block may be referred to as the image defect candidate area.

The above-described processing is described in detail below with reference to FIGS. 13A, 13B, 13C, 13D, 13E, and 13F. FIG. 13E illustrates an edge image obtainable by adding the horizontal difference image (see FIG. 10B) and the vertical difference image (see FIG. 10C) of the reference image (see FIG. 13A). In FIG. 13E, a white portion indicates the presence of a strong edge, and a black portion is a portion where no edge is present. In FIG. 13E, there is not any edge in an area 1304 that corresponds to a peripheral area of the image block 1302. Therefore, it is determined that the region of the image block 1302 is not the area to be subjected to the high-precision positioning processing. Further, in FIG. 13E, an edge is present in an area 1305 that corresponds to a peripheral area of the image block 1303. Therefore, it is determined that the region of the image block 1303 is an area to be subjected to the high-precision positioning processing.

Referring back to the flowchart of FIG. 9, in step S907, the determination unit 712 sets the processing target image block area selected in step S904 as an image defect portion. Then, the determination unit 712 copies a pixel block of the determination result image having been determined as an image defect and output in step S903 to a final determination result image. The final determination result image is an image whose pixel values are all zero in a state where nothing is added, and is an image that expresses a final determination result. Example processing to be performed in this case is described in detail below with reference to FIGS. 13D and 13F. The determination unit 712 copies the pixel block 1302 illustrated in FIG. 13D to a final determination result image, and generates the final determination result image including a pixel block 1306 illustrated in FIG. 13F. The determination unit 712 stores information relating to the pixel block copied to the final determination result image in the memory unit 704. Then, the operation proceeds to step S912.

In step S908, the resolution conversion unit 708, the positioning unit 710, the image deforming unit 709 cooperatively perform high-precision positioning processing. The high-precision positioning processing to be performed in step S908 is higher in accuracy than the positioning processing performed in step S902. More specifically, the accuracy of the high-precision positioning processing is a second precision that is higher than the first precision.

First, the resolution conversion unit 708 extracts a partial reference image and a partial scanned image, each being a partial image that includes an image defect candidate pixel block and its peripheral area, from the reference image and the scanned image, respectively. Any size is employable for the above-described partial image if it is suitable to select a patch in the high-precision positioning processing. However, if the partial image is smaller, it is useful to reduce the amount of calculations.

Next, the resolution conversion unit 708 converts the partial scanned image and the partial reference image into images whose resolution is suitable for the high-precision positioning processing (e.g., high-resolution of 300 dp×300 dpi). The image resolution for the high-precision positioning processing is higher than the image resolution for the positioning to be performed in step S902.

Then, the positioning unit 710 obtains affine transformation parameters (i.e., positioning information) with reference to the partial scanned image and the partial reference image that have been subjected to the above-described resolution conversion processing. In this case, the positioning unit 710 uses the selection parameter dedicated to the high-precision positioning processing to obtain the affine transformation parameters. For example, the selection parameter dedicated to the high-precision positioning processing is equivalent to a setting of a dense density according to which one patch can be selected from an area of 200 pixels×200 pixels when a large patch size of 128 pixels×128 pixels is employed for the patch. The above-described patch density is significantly high compared to the patch density in the positioning processing performed in step S902.

FIG. 14A illustrates an example of the partial reference image. FIG. 14B illustrates a plurality of patches each indicated by a black dotted line, which can be used when the partial reference image illustrated in FIG. 14A is subjected to the high-precision positioning processing. The patch size is large and the density is high because of the high-precision positioning processing. FIG. 14C illustrates an example of the partial scanned image.

As example processing, in a case where the patches to be used in the high-precision positioning processing cannot be sufficiently extracted from the partial reference image, the positioning unit 710 can use the information indicating the positional correspondence relationship between the reference patch and the scan patch obtained in step S902. Further, in this case, the positioning unit 710 can use information indicating a positional correspondence relationship between a partial image of an edge feature in a peripheral area of the pixel block, which serves as a reference patch, and the scan patch. Using the above-described information enables obtaining affine transformation parameters considering the positional deviation of a neighboring area of the pixel block.

Finally, the image deforming unit 709 performs image deformation processing on the partial reference image using the affine transformation parameters obtained by the positioning unit 710, and obtains an image usable in the following collation processing after completing the positioning relative to the partial scanned image.

In step S909, the collation unit 711 performs collation processing based on the partial scanned image and the partial reference image obtained in step S908. The collation unit 711 processes the partial scanned image and the partial reference image and obtains a corrected difference image relating to a partial area and information relating to the pixel block as a collation result.

In step S910, the determination unit 712 performs image defect determination processing using the collation result obtained in step S909 and generates a determination result image to be output.

A criterion to be used in the above-described determination processing, to determine the normality (i.e., non-defectiveness of an image), is equivalent to or severer than the criterion used in the determination processing in step S903. In a case where the image feature quantity is a value variable depending on the resolution, the "equivalency" is determined based on a comparison using a normalized criterion. For example, if the criterion relating to the area size is "OK if it is less than 4 pixels of 150 dpi" in step S903 and the resolution of the high-precision positioning processing is 300 dpi in step S908, the equivalent criterion is "OK if it is less than 8 pixels of 300 dpi" because 4 pixels of 150 dpi is not different from 8 pixels of 300 dpi in physical area size.

The reason why the equivalent or severer criterion is used in the high-precision positioning processing is because the feature of a local image to be subjected to the high-precision positioning processing includes an edge feature. More specifically, the area to be subjected to the high-precision positioning processing generally includes an edge of a text part. Therefore, it is useful to apply a severe criterion to the above-described area in determining an image defect, especially, when the visual impression is taken into consideration.

In a case where there is not any image block of the image defect in the determination result image relating to the partial area output as the determination processing result by the determination unit 712, it is determined that the pixel block region has been regarded as an image defect candidate due to an erroneous determination. In such a case, the operation proceeds to step S911. If the pixel block is present, the pixel block is identified as an image defect. Therefore, the operation proceeds to step S907.

For example, in a case where FIG. 14A illustrates the partial reference image and FIG. 14C illustrates the partial scanned image, FIG. 14D illustrates the determination result image of the partial area. In FIG. 14D, all pixel values are 0. It means that the pixel block region (see FIG. 14B)) detected in step S903 has been regarded as an image defect candidate area because of the lowness in precision of the positioning processing performed in step S902.

In step S911, the determination unit 712 does not set the processing target image block (i.e., the image defect candidate selected in step S904) area selected in step S904 as an image defect portion. Then, the operation proceeds to step S912. Example processing to be performed in this case is described in detail below with reference to FIGS. 13D and 13F. The determination unit 712 does not copy the pixel block 1303 illustrated in FIG. 13D to the final determination result image, and generates the final determination result image illustrated in FIG. 13F.

In step S912, the main control unit 703 determines whether a processing abort condition has been satisfied. The abort condition is, for example, two types of settings. The first one is a setting (a) that includes forcibly stopping the processing in response to a detection of an image defect portion to promptly start emergency processing.

The second one is a setting (b) that includes continuing the processing without any interruption to inform a user of the accurate number of image defects and the position of each image defect. These settings can be set by each user via the operation unit 705.

If the main control unit 703 determines that the setting is the setting (a), the operation proceeds to step S913. If it is determined that the setting is the setting (b), the operation proceeds to step S904.

In step S913, the main control unit 703 determines whether the emergency processing is necessary. The emergency processing is performed in response to a detection of an image defect (i.e., when the final determination result image includes an image block). However, a user may want to confirm the level of each image defect after the printing operation is entirely completed. In such a case, the user can operate the operation unit 705 to set whether to actually perform the emergency processing in response to detection of an image defect. In a case where the emergency processing to be performed in response to detection of an image defect is set beforehand, the operation proceeds to step S914. In other cases, the operation proceeds to step S915.

In step S914, the main control unit 703 performs emergency processing. There are two types of settings for the emergency processing. More specifically, the main control unit 703 performs the emergency processing according to a first setting or a second setting. Each user can operate the operation unit 705 to select a desired setting for the emergency processing.

First, an example operation that can be performed when the first setting is set is described below. The main control unit 703 transmits inspection determination information to the main control unit 203 of the image forming apparatus 101. The main control unit 203 controls the image forming apparatus 101 to stop feeding sheets and discharge staying sheets from the conveyance path before deactivating the apparatus.

Simultaneously, the main control unit 703 transmits the inspection determination information to the main control unit 601 of the finisher 103. The main control unit 601 controls the finisher 103 to discharge all sheets received from the inspection apparatus 102 to the escape tray 501. Further, the main control unit 703 controls the paper feeding roller 401, the conveyance belt 402, and the discharge roller 404 to discharge all staying sheets that have been discharged from the image forming apparatus 101 to the finisher 103. The above-described sequential processing can realize stopping the image forming apparatus 101 while taking the recovery into consideration.

Next, an example operation that can be performed when the second setting is set is described below. The main control unit 703 transmits the inspection determination information to the main control unit 601 of the finisher 103. The main control unit 601 controls the finisher 103 to discharge a sheet, if it is determined as a printed product including an image defect in inspection determination processing, to the escape tray 501. The finisher 103 discharges the following printed product, if it does not include any image defect, to the output tray 502. Through the above-described processing, the image forming apparatus 101 can continuously perform the printing operation while discharging only the printed product including an image defect to the escape tray 501.

In step S915, the main control unit 703 causes the operation unit 705 to display the inspection processing result. In this case, simply displaying the final determination result image is not useful to let a user recognize the image defect. Therefore, the main control unit 703 generates a composite image by combining the final determination result image with the scanned image and displays the composite image on the operation unit 705. In this case, any combination method is usable if the location of each image defect can be clearly recognized. For example, the composite image can include a red color portion that indicates a non-zero portion included in the final determination result image, which is superimposed on the scanned image. Further, it is useful to display information (e.g., positional information and image feature quantity) relating to an image block that has been regarded as an image defect. In a case where the emergency processing is performed, the main control unit 703 causes the operation unit 705 to display an inspection processing result including emergency processing contents. Further, as another example display of the inspection processing result in step S915, the main control unit 703 can cause the operation unit 705 to display NG/OK information indicating whether the printed product includes an image defect, independently or together with other display contents.

In the present exemplary embodiment, in step S915, the main control unit 703 causes the operation unit 705 of the inspection apparatus 102 to display the inspection processing result. However, any another configuration capable of notifying a user of the inspection processing result is employable. For example, the main control unit 703 can cause the operation unit 207 of the image forming apparatus 101 to display the inspection processing result.

As described above, taking the characteristics of each image defect candidate area into consideration in determining an area to be only subjected to the low-precision positioning processing and an area to be sequentially subjected to the low-precision positioning processing and the high-precision positioning processing is useful to increase the processing speed while maintaining the accuracy of the inspection processing.

In the present exemplary embodiment, only one criterion is used as the first criterion for the collation/determination processing in step S903. Alternatively, it is useful to set the first criterion to be variable depending on the paper type (e.g., thick paper or plain paper) of an inspection target printed product. For example, the possibility that a printed product using thick paper is an important printed product (e.g., a front cover) is relatively high. Therefore, it is useful to set a severer criterion to detect an image defect included in each thick paper, compared to that for plain paper. If the criterion becomes severer, not only the number of image defect candidates increases but also the amount of calculations in the following processing increases. As a result, the processing time increases. However, the image forming apparatus 101 has a sufficient processing time because the printing speed required for thick paper is a half of the processing speed required for plain paper.

The user can set the above-described information relating to the paper type via the operation unit 207 of the image forming apparatus 101. Alternatively, the paper type information may be acquired together with PDL data via the NIC unit 202. The determination unit 712 receives the paper type information and changes the criterion based on the received paper type information. For example, the change of the criterion can be realized by shifting the boundary line between the OK region and the NG region illustrated in FIG. 12.

Further, the determination processing in step S906 according to the present exemplary embodiment uses the information relating to an edge of a reference image to determine whether a target pixel block region is to be subjected to the high-precision positioning processing. However, the determination processing in step S906 is not limited to the processing content using the edge information.

For example, it is useful that the determination unit 712 receives information indicating the location where an image object is present from the image forming apparatus 101 and performs the above-described determination processing based on the received information. For example, the information indicating the location where an image object is present can be generated in the process of rasterizing PDL data into a bitmap image in the image forming apparatus 101, and can be used to discriminate an image object (i.e., a printing area) from the rest (i.e., a non-printing area).

More specifically, there is not any edge (i.e., a feature point) in the non-printing area. Therefore, the non-printing area can be regarded as a white paper area or a background color area. Accordingly, in a case where it is understood that no image object is present in a target pixel block region, it is desired that the determination unit 712 determines that the pixel block is an image defect and the operation proceeds to step S907. In other cases, the operation proceeds to step S908.

More specifically, in the processing to be performed in step S906, edge and image object information is feature information that can be used to determine whether the target pixel block region is an area to be subjected to the high-precision positioning processing. The feature information can be any indication that can determine whether an image defect candidate has been detected due to the influence of the low-precision positioning accuracy. For example, the complexity of an image (e.g., a wide variety of colors or complicated shape of an image object) is usable.

Further, in the processing to be performed in step S908, all of resolution, patch size, and patch density parameters are selected in such a way as to improve the positioning accuracy compared to that of the low-precision positioning processing. However, the present invention is not limited to the above-described embodiment. The selection of these parameters is appropriately determined in such a way as to perform high-precision positioning processing in step S908 whose accuracy is higher than that of the low-precision positioning processing in step S902.

Hereinafter, a second exemplary embodiment is described below.

In the first exemplary embodiment, the image defect candidate area has been determined with reference to the criterion illustrated FIG. 12. The criterion illustrated in FIG. 12 divides the image defect candidate area into two regions (i.e., the OK region and the NG region). In the present exemplary embodiment, a new criterion is employed to further divide the NG region into a high-precision positioning area and an image defect portion.

The present exemplary embodiment is different from the first exemplary embodiment in the processing content of step S906. Therefore, the processing to be performed in step S906 is described in detail below, although descriptions similar to those already described in the first exemplary embodiment are not repeated. Processing and configuration in other steps according to the present exemplary embodiment are similar to those described in the first exemplary embodiment.

Example processing to be performed in step S906 according to the present exemplary embodiment is described in detail below. In the present exemplary embodiment, the processing in step S906 determines whether the pixel block region selected in step S905 is an area to be subjected to the high-precision positioning processing. The determination processing in step S906 includes evaluating the image feature quantity of a pixel block that has been determined as an image defect candidate in step S903 in addition to the processing performed in step S906 described in the first exemplary embodiment.

Figure 16:
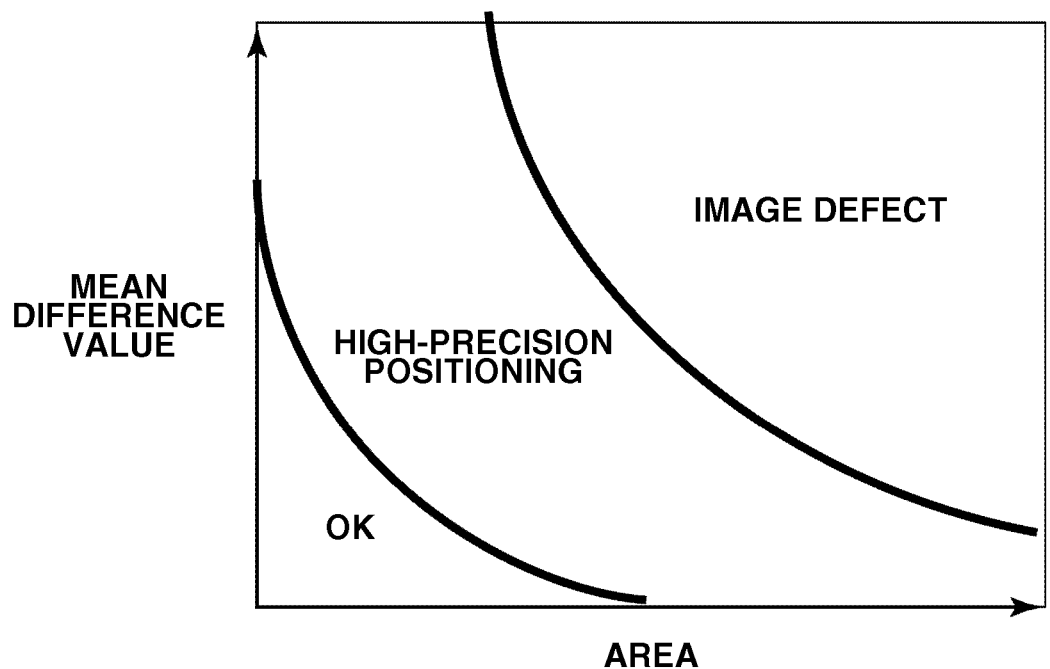
FIG. 16 illustrates an image defect criterion according to the second exemplary embodiment.

For example, in a case where the image feature quantity is the mean difference value and the area size, it is hard to imagine that a pixel block has been detected as an image defect candidate due to the positioning accuracy if both of the mean difference value and the area size are large. Hence, as illustrated in FIG. 16, the criterion employed in the present exemplary embodiment includes the high-precision positioning area and the image defect portion in the image feature space, which can be obtained by dividing the NG region illustrated in FIG. 12 into two regions. The high-precision positioning area indicates that a pixel block in this area is an image defect candidate that is to be subjected to the high-precision positioning processing in step S908. Further, the image defect portion indicates that a pixel block in this area can be identified as an image defect without requiring the high-precision positioning processing.

FIG. 16 illustrates a second criterion graph indicating a boundary line between the high-precision positioning area and the image defect portion in addition to a first criterion graph indicating a boundary line between the OK region and the NG region illustrated in FIG. 12, which are displayed in the feature quantity space. The above-described graph information (more specifically, first criterion information and second criterion information) is stored beforehand in the memory unit 704. In the present exemplary embodiment, the determination unit 712 acquires the above-described graph information from the memory unit 704 when the determination unit 712 performs the determination processing.

The determination unit 712 plots the image feature quantity of each processing target pixel block in the feature quantity space illustrated in FIG. 16.

In a case where the image feature quantity of a processing target pixel block is plotted in an area that is far from the OK region of FIG. 16 (for example, the image defect portion illustrated in FIG. 16), the determination unit 712 regards the pixel block as an image defect. More specifically, in a case where the image feature quantity of a pixel block is equal to or greater than a value of the boundary indicated by the second criterion graph, the pixel block is regarded as an image defect. Then, the operation proceeds to step S907.

On the other hand, in a case where the image feature quantity of a processing target pixel block is plotted in an area that is not so far from the OK region of FIG. 16 (for example, the high-precision positioning area illustrated in FIG. 16) in the image feature space, the determination unit 712 regards the pixel block as a high-precision positioning processing target candidate. More specifically, in a case where the image feature quantity of a pixel block is less than the value of the boundary indicated by the second criterion graph, the pixel block is regarded as a high-precision positioning processing target candidate. Then, similar to step S906 described in the first exemplary embodiment, the determination unit 712 determines whether an edge is present in a peripheral area of the pixel block that has been regarded as the high-precision positioning processing target candidate. If the determination unit 712 confirms the presence of an edge in the peripheral area of the pixel block, the operation proceeds to step S908. In other cases, the operation proceeds to step S907. The processing using the criterion illustrated in FIG. 16 and the processing in step S906 described in the first exemplary embodiment can be performed with the reversed order.

The foregoing is example processing to be performed in step S906 according to the present exemplary embodiment.

FIGS. 15A, 15B, 15C, and 15D illustrate example effects that can be brought by the present exemplary embodiment. FIG. 15A illustrates a reference image. FIG. 15B illustrates a scanned image. The scanned image includes an image defect 1501 and an image defect 1502. FIG. 15C illustrates a determination result image generated in step S903, in which a pixel block 1503 corresponds to the image defect 1501 and a pixel block 1504 corresponds to the image defect 1502. Further, the determination result image illustrated in FIG. 15C includes a pixel block 1505 that corresponds to a ruled line of the scanned image.

In a case where the image feature quantities of these pixel blocks are plotted in the feature quantity space illustrated in FIG. 16, it is presumed that the image feature quantity of the pixel block 1503 is plotted in an image defect portion and the pixel blocks 1504 and 1505 are plotted in the high-precision positioning area. Further, it is presumed that an edge is present in a peripheral area of the pixel block 1503 and in a peripheral area of the pixel block 1505.

In the above-described case, the processing described in the first exemplary embodiment sets two pixel blocks 1503 and 1505 (whose peripheral area includes an edge) as target pixel blocks to be subjected to the high-precision positioning processing. However, in the present exemplary embodiment, the pixel block 1503 does not become a target to be subjected to the high-precision positioning processing because the image feature quantity of the pixel block 1503 is large in both the mean difference value and the area size. Accordingly, in the present exemplary embodiment, the pixel block 1505 is the only one image defect candidate and the high-precision positioning processing is performed for only one image defect candidate area. FIG. 15D illustrates a final determination result image obtained through determination processing performed after the high-precision positioning processing is completed. As understood from FIG. 15D, the pixel block 1505 is not detected as an image defect area.

As described above, the present exemplary embodiment can reduce the number of areas to be subjected to the high-precision positioning processing while suppressing reduction in inspection accuracy that may occur due to the lowness in precision of the positioning processing. As a result, the amount of calculations can be further reduced and the processing time can be further reduced.

Further, in the present exemplary embodiment, the processing using the second criterion illustrated in FIG. 16 has been performed in step S906. However, it is useful to execute the above-described processing in the determination processing in step S903.

More specifically, in step S903, the determination unit 712 determines whether the image feature quantity of each pixel block is plotted in one of the OK region, the high-precision positioning area, and the image defect portion with reference to the first criterion and the second criterion illustrated in FIG. 16. Then, the determination unit 712 adds information to let the operation proceed to step S907 without performing the determination processing in step S906 for each pixel block that belongs to the image defect portion.

Through the above-described processing, it becomes feasible to prevent the processing in step S906 from being executed for each pixel block that can be regarded as an image defect at the timing of the determination processing in step S903. Therefore, the processing of step S904 and the following steps can be speedily executed.

Further, in the present exemplary embodiment, as described in the first exemplary embodiment, it is useful to use the image object information in the processing to be performed in step S906.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An inspection apparatus configured to inspect a printed product by positioning a reading target image obtainable by reading the printed product relative to a reference image and collating the reading target image with the reference image, the inspection apparatus comprising:
   a memory;
   a processor coupled to the memory which executes the following:
   performing positioning processing for the reference image and the reading target image with a first precision;
   detecting an image defect candidate area by collating the reading target image with the reference image,
   determining whether an edge area is present in an area, of the reference image, which corresponds to the detected image defect candidate area,
   wherein, in a case where it is determined that the edge area is present in the area of the reference image, the positioning processing is newly performed for the reference image and the reading target image in the image defect candidate area with a second precision that is higher than the first precision and the reading target image is collated with the reference image in the image defect candidate area in which the positioning processing has been performed with the second precision, and
   wherein, in a case where it is not determined that the edge area is present in the area of the reference image, the positioning processing for the reference image and the reading target image in the image defect candidate area with the second precision is not performed and the image defect candidate area is detected as an area having an image defect.

2. The inspection apparatus according to claim 1, wherein the positioning processing is configured to perform the positioning processing for the reference image and the reading target image based on a positional correspondence relationship between images in partial areas of the reference image and the reading target image, and
   wherein the positioning processing is configured to control a positioning accuracy by controlling at least one of resolution, area size, number of areas of the reference image to be used in the positioning processing.

3. The inspection apparatus according to claim 1, wherein the detecting includes:
- detecting an area in which a difference between the reference image and the reading target image is present by performing the collation after the positioning processing using the first precision is completed; and
- detecting the image defect candidate area based on a magnitude of the difference detected,
- wherein the area including the difference as the image defect candidate area is detected, in a case where the magnitude of the difference detected is equal to or greater than a first criterion threshold that is used to regard the area as an image defect candidate, and
- wherein the first criterion threshold is variable depending on a type of paper to be used for the printed product.

4. The inspection apparatus according to claim 1, wherein the detecting includes:
- detecting an area in which a difference between the reference image and the reading target image is present by performing the collation after the positioning processing using the first precision is completed; and
- detecting the image defect candidate area based on a magnitude of the difference detected,
- wherein the area including the difference as the image defect candidate area is detected, in a case where the magnitude of the difference detected is equal to or less than a second criterion threshold that is used to regard the area as an image defect.

5. An inspection method for inspecting a printed product by positioning a reading target image obtainable by reading the printed product relative to a reference image and collating the reading target image with the reference image, the inspection method comprising:
- performing positioning processing for the reference image and the reading target image with a first precision;
- detecting an image defect candidate area by collating the reading target image with the reference image, which have been subjected to the positioning processing using the first precision;
- determining whether an edge area is present in an area, of the reference image, which corresponds to the detected image defect candidate area,
- wherein, in a case where it is determined that the edge area is present in the area of the reference image, the positioning processing is newly performed for the reference image and the reading target image in the image defect candidate area with a second precision that is higher than the first precision and the reading target image is collated with the reference image in the image defect candidate area in which the positioning processing has been performed with the second precision to thereby detect an image defect, and
- wherein, in a case where it is not determined that the edge area is present in the area of the reference image, the positioning processing for the reference image and the reading target image in the image defect candidate area with the second precision is not performed and the image defect candidate area is detected as an area having an image defect.

6. A non-transitory computer-readable storage medium storing a program that causes a computer to execute an inspection method for inspecting a printed product by positioning a reading target image obtainable by reading the printed product relative to a reference image and collating the reading target image with the reference image, the inspection method comprising:
- performing positioning processing for the reference image and the reading target image with a first precision;
- detecting an image defect candidate area by collating the reading target image with the reference image, which have been subjected to the positioning processing using the first precision;
- determining whether an edge area is present in an area, of the reference image, which corresponds to the detected image defect candidate area,
- wherein, in a case where it is determined that the edge area is present in the area of the reference image, the positioning processing is newly performed for the reference image and the reading target image in the image defect candidate area with a second precision that is higher than the first precision and the reading target image is collated with the reference image in the image defect candidate area in which the positioning processing has been performed with the second precision to thereby detect an image defect, and
- wherein, in a case where it is not determined that the edge area is present in the area of the reference image, the positioning processing for the reference image and the reading target image in the image defect candidate area with the second precision is not performed and the image defect candidate area is detected as an area having an image defect.

* * * * *